(12) United States Patent
Llewelyn

(10) Patent No.: US 10,884,454 B2
(45) Date of Patent: *Jan. 5, 2021

(54) LINE-OF-SIGHT DEVICE HOUSING A FIRST DEVICE AND CONFIGURED FOR DISPLAY OF CONTENT FROM A SECOND DEVICE

(71) Applicant: Blue Storm Media, Inc., Redwood City, CA (US)

(72) Inventor: Gareth Llewelyn, High Wycombe (GB)

(73) Assignee: blue storm media inc, Redwood City, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 15/917,548

(22) Filed: Mar. 9, 2018

(65) Prior Publication Data

US 2018/0267759 A1    Sep. 20, 2018

Related U.S. Application Data

(63) Continuation-in-part of application No. 15/645,891, filed on Jul. 10, 2017, and a continuation-in-part of (Continued)

(51) Int. Cl.
*G06Q 30/02* (2012.01)
*G06F 1/16* (2006.01)
(Continued)

(52) U.S. Cl.
CPC ............. *G06F 1/163* (2013.01); *G06F 3/147* (2013.01); *G06Q 30/0238* (2013.01); *G07C 9/28* (2020.01); *G09G 2380/06* (2013.01); *H04W 4/80* (2018.02)

(58) Field of Classification Search
CPC ........................ G06Q 30/0241; G06F 1/163
(Continued)

(56) References Cited

U.S. PATENT DOCUMENTS 8,931,896 B2    1/2015    Blum et al.
9,129,249 B2    9/2015    Hu et al.
(Continued)

OTHER PUBLICATIONS

Goldstein, Phil, Startup OnBeep Promises Push-To-Talk Wearable Device by Year-End, FierceWireless Questex, Aug. 20, 2014 (Year: 2014).*

*Primary Examiner* — Matthew L Hamilton
(74) *Attorney, Agent, or Firm* — Patent Ventures, LLC

(57) ABSTRACT

Disclosed is a line-of-sight wearable device worn over a chest of a first user, the device comprising: a housing defining at least a first electronic device storage location; a wall on said housing having at least a portion to expose a display of the first electronic device; the wall on said housing configured to open to removably secure the first electronic device within the at least first electronic device storage location; and the first electronic device that is pair-able wirelessly with a second electronic device, wherein at least one of a display or audio event on the first electronic device is caused programmably based on a predefined line-of-sight rule and the at least one of the display or audio event is exposed in a line-of-sight to at least a second user via any one of the walls of the housing worn over the chest of the first user.

18 Claims, 21 Drawing Sheets

Related U.S. Application Data application No. 15/409,460, filed on Jan. 18, 2017, now abandoned.

(60) Provisional application No. 62/603,163, filed on May 17, 2017.

(51) Int. Cl.
*G06F 3/147* (2006.01)
*H04W 4/80* (2018.01)
*G07C 9/28* (2020.01)

(58) Field of Classification Search
USPC .......................................................... 705/14
See application file for complete search history.

(56) References Cited

U.S. PATENT DOCUMENTS

| | | | |
|---|---|---|---|
| D761,151 S * | 7/2016 | Weems | D11/80 |
| 9,804,571 B2 * | 10/2017 | Lee | A44C 25/004 |
| 10,043,209 B2 | 8/2018 | Cooke et al. | |
| 10,261,547 B1 * | 4/2019 | DiMeglio | G06F 1/1628 |
| 10,264,175 B2 | 4/2019 | Cronin et al. | |
| 10,515,393 B2 | 12/2019 | Todasco et al. | |
| 10,553,102 B1 * | 2/2020 | Gillespie, IV | H04M 1/04 |
| 10,575,423 B2 * | 2/2020 | DiMeglio | A41D 25/003 |
| 10,580,217 B2 | 3/2020 | Jones et al. | |
| 2011/0216931 A1 * | 9/2011 | Bui | H04R 1/1091 |
| | | | 381/333 |
| 2015/0348498 A1 | 3/2015 | Anderson et al. | |
| 2015/0149924 A1 * | 5/2015 | Tsai | G06F 1/163 |
| | | | 715/748 |
| 2015/0193777 A1 | 7/2015 | Aidasani et al. | |
| 2016/0028947 A1 * | 1/2016 | Wexler | G01S 3/7864 |
| | | | 348/207.11 |
| 2016/0034002 A1 * | 2/2016 | Yang | G06F 1/1656 |
| | | | 361/679.03 |
| 2016/0134737 A1 * | 5/2016 | Pulletikurty | G06F 3/0227 |
| | | | 715/735 |
| 2016/0274549 A1 * | 9/2016 | Rasmus | A44C 11/00 |
| 2018/0239582 A1 * | 8/2018 | Goss, III | G06F 3/167 |
| 2019/0125264 A1 * | 5/2019 | Abreu Oramas | A61B 5/6824 |

\* cited by examiner

LINE-OF-SIGHT DEVICE HOUSING A FIRST DEVICE AND CONFIGURED FOR DISPLAY OF CONTENT FROM A SECOND DEVICE

RELATED U.S. APPLICATIONS DATA

This application claims priority under 35 U.S.C. 120 to non-provisional application Ser. No. 15/645,891, filed on Jul. 10, 2017, entitled "Color and Symbol Coded Display on a Digital Badge for Communicating Permission to Approach and Activate Further Digital Content Interaction", which in turn claims priority under 35 U.S.C. 119(e) to provisional patent application No. 62/603,163, filed on May 17, 2017, entitled "Non-verbal Person to Person Line of Sight Electronic Communication Protocol Standard", which are hereby incorporated by reference in their entirety. In addition, the applications claim priority under 35 U.S.C. 120 to non-provisional application Ser. No. 15/409,460, filed on Jan. 18, 2017, entitled "Interactive Wearable Badge for Advertising".

FIELD OF INVENTION

The present invention relates to a housing configured for line-of-sight display of programmable content from a second device, and more particularly, relates to a symbol and, or color-coded display and protocol for communicating a permission to approach and to further activate a digital interaction.

BACKGROUND OF INVENTION

Badges have long been a mainstay in public gathering situations as a way to identify the people engaged in the public gathering. It has also been a primary way of communicating to others a level of credential to facilitate access or a professional process. While the badge has long been simply a name card, with title, and possibly a photo, they have recently morphed into digital versions. Digital badges may be operatively coupled to networked devices and be enabled to reconfigurably display items. According to one embodiment disclosed and claimed by Identity Systems, Inc. (US20150348498), the digital badge device may include a mounting means, power source, microprocessor, memory, and display to receive and display digital content from a network device according to a pre-defined rule. Identity Systems badge may be associated with an individual or employee, and then automatically display at least the name of the individual or employee based on the association and the pre-defined interaction rules between the digital badge and networked device.

Identity Systems digital badge does not disclose or claim for any digital interaction between digital badges. In other words, the badges are not configured to communicate between badges or share digital content between badges or from badge to networked device. Therefore, the badges are simply contemplated as being a visual display of identity or group/brand association—that may be dynamically displayed according to a pre-defined rule. However, it is not envisioned to serve as a true digital communication tool, that may interact with other badges, and push digital content from one badge to another badge—in a dynamic and targeted fashion.

Additionally, badge-displayed content or badge-badge shared content is not enabled for social media sharing or inclusion into a running virtual footprint of a badge wearer. What's more, without tracking of such a virtual footprint, behavior or influence ratings cannot be accurately identified in order to dynamically push targeted content.

Aside from a lack of badge-badge or badge-device interactivity or footprint tracking for targeted content delivery, digital badges lack a system or protocol for communicating an approach or further engagement of digital content interaction. More specifically, badges, such as Invent Systems, lack a symbol or color-coded display cue between users who are in their 'line of sight' (or groups of people) for communicating a permission to approach, and more particularly, further sharing of content messages, emotions, feelings, wellbeing, states of mind, general interest, marketing and advertising, and interactive behavior for likeminded people.

Digital badges need a form of a universal language for the digital communication between at least two badges or at least between badge and receiver. The communication protocol would also need to take this language into account to enable humans to act on the language interaction. Conventionally, people cannot transmit a message directly to another person who is in their line of sight without talking, signaling or using a facial expression to communicate with them. There is currently no method for a person to send an electronic signal to person in their line of sight directly. There is currently no method for an individual to display and instantly transmit their willingness to be approached, feelings, emotions, state of mind, state of like-mindedness, social media footprint, general interests and digital information or online dashboards. Furthermore, there is no global standard or universal symbol language to communicate non-verbal approach messages via badge devices. Currently, there is also no way for two likeminded people to share non-verbal content messages between badges and, or static devices.

Furthermore, there is currently no device or method for a user to wear a device with a housing configured for line-of-sight display of a first device, operably coupled to a second device for any programmable content to be consumed via the line-of-sight display. More particularly, there is currently no device or method for a user to wear a device with a housing configured for line-of-sight display of a first device, operably coupled to a second device for standardized, non-verbal approach messages to be exchanged to at least a second user for further digital interaction via the line-of-sight display.

The granted patent, U.S. Pat. No. 8,931,896B2, assigned to E-Vision Smart Optics, Inc., describes and claims an eyewear frame disposed with a docking station configured to house an electronic device for video playback and power. However, the docking station and the docked device are not intended for outward display, and rather, they are configured strictly for self-consumption. The '896 patent does not describe or claim a device or method for line-of-sight outward display of a first device, operably coupled to a second device for any programmable content or a standardized approach message to be displayed to at least a second user via the line-of-sight display.

SUMMARY

The non-verbal line of sight electronic communication protocol (NVP) described herein allows the viewer to instantly understand the symbol and, or color-coded display cues of the interactive badge and understand whether the individual displaying the visual cues can be: (1) approached and (2) whether an information exchange can take place immediately or in the future. It also allows the user to send and receive information that could not previously be exchanged through normal human communication means. Generally, the non-verbal line of sight electronic communication protocol (NVP) includes a standardized set of symbols, colors, and electronic communication protocol standards that enhance human communication to a new level. The NVP allows individuals to create new human behaviors and send messages beyond the natural 5 senses. The NVP allows individuals to build their own window of their life, display it on a personal digital display, and then have others interact with them. The NVP allows individuals to 'think' by creating their life window, 'act' by uploading to their personal digital display, and 'do' by using the interactive communication protocol.

The NVP allows communication between humans to take place while in their line of sight over and above their normal senses. The NVP can be implemented on any personal digital display that is running the NVP protocol. This protocol allows a signal to be passed between NVP devices only when certain combination of symbols and colors are displayed. This communication can trigger the transfer of information from one individual to another. Preferably, this NVP interaction guided by the standardized set of symbols and, or colors may be displayed on a center and, or surround visual display of an interactive badge worn by a first user, and in the line of sight by at least a second user.

It is one object of the invention to disclose a non-verbal line of sight electronic communication (NVP) system, comprising an interactive badge device with a line of sight device visual display. The device visual display being at least one of a surround device display and, or a center device display. Additionally, the device may have an interface module housed within the interactive badge device and configured for causing an event state change between at least one of a mobile device, surround device display and, or center device display. Moreover, the system may have a processor; a non-transitory storage element coupled to the processor; and encoded instructions stored in the non-transitory storage element, wherein the encoded instructions when implemented by the processor, configure the system to: (1) upload NVP interaction rules and curated NVP content for display on any one of a first user's device based on the first user's interaction rules and scheduler criteria; (2) send at least one of an interaction and, or content message based on the first user's interaction rules and scheduler criteria to at least one of a second user's device within range and contingent on the second user's interaction rules; and (3) based on the second user's interaction rules, accept or deny the first user interaction message, and if accepted, decode a unique tag to trigger a unique digital event, wherein the digital event may be at least one of an image, video, sound, vibration, flash, signal, symbol, color, text, upload, sequence, download on any one of the user's device visual display, and, or over a network.

It is another object of the invention to disclose a non-verbal line of sight electronic communication protocol. The communication protocol comprising a non-verbal symbol language for communicating wirelessly over electronic devices, including interactive badges and, or displays, between users and, or static receivers, who are in one another's line of sight; and the symbol language displayed on the interactive badge and, or display and, or static receivers communicate whether a first user can approach at least a second user or not for further digital interaction.

It is another object of the invention to provide for a device-centric, non-verbal line of sight electronic communication protocol. The device-centric, non-verbal line of sight electronic communication protocol comprising a non-verbal symbol language for communicating wirelessly over electronic devices, including an interactive badge with a line of sight device visual display, between users who are in one another's line of sight. The symbol language further comprising a set of any shaped and, or colored symbols that are programmably displayed on the device visual display, wherein the device visual display is at least one of a surround device display and, or a center device display. Furthermore, based on the programmably displayed set of shaped and, or colored symbols on the device visual display, communicate whether a first user can approach at least a second user or not for further digital interaction.

In yet another object of the invention, a device or method is provided for a line-of-sight outward display of a first device, operably coupled to a second device for any programmable content or a standardized approach message to be displayed to at least a second user via the line-of-sight display. In one aspect, a line-of-sight wearable device worn over a chest of a first user may comprise a housing defining at least a first electronic device storage location for line-of-sight display; and the first electronic device electronically coupled with a second electronic device, wherein at least one of a display or audio event on the first electronic device is caused programmably based on a pre-defined line-of-sight rule and the at least one of the display or audio event is exposed in a line-of-sight to at least a second user via the line-of-sight display of the housing worn over the chest of the first user.

Aspects and advantages of this invention may be realized in other applications, aside from the intended application of interactive badge device-mediated communication and a communication protocol thereof. Other pertinent applications that may exploit the aspects and advantages of this invention are: digital advertising and digital commerce platforms integrated into the NVP communication system and protocol. For instance, an activity footprint of a user's displayed NVP content and or replicated digital or virtual NVP content may be tracked for advertisers to target the most influential users for a brand display-for-hire. Moreover, a plurality of advertisers may bid for the most influential user's using a bidding module within the advertising platform, creating upward pressure on the brand display-for-hire fees. What's more, tracking of a user's NVP line of content displayed or virtually replicated, may enable a commerce platform or participants of the platform to push suggested digital content that is personalized to the user based on the user's running NVP content. Yet another digital event that may be triggered: may be the interaction of the badge device with other badge devices or fixed-access devices near access-gates, wherein the symbol and, or color-coded display on badge or fixed-access devices invite for approach; once approached and interacted with, uploading an authentication tag over a network to a remote server; validating the authentication tag against a library of authenticated tags; downloading the validated tag and using the symbol and color-coded display on the badge device or fixed-access device to communicate permission to access. Additional digital events may include enabling the same interactive badge devices or fixed-access devices to process payment transactions, over a network, via an intermediary payment system.

Other aspects and advantages of the invention may be a device housing a first device, such as, but not limited to, a smart watch, to be worn over the chest of a user and configured for outward line-of-sight display of programmable content. Content may be a standardized symbol and, or color-coded permission to approach and digitally interact with. Alternatively, depending on the line-of-sight rule defined by the user, the content may simply be a static or loop of images or video for consumption by at least another user. Yet other aspects and advantages of the invention may be apparent from the following description and the appended claims.

BRIEF DESCRIPTION OF FIGURES

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiment and not by others. Similarly, various requirements are described which may be requirements for some embodiments but not other embodiments.

Overview:

The present disclosure relates to a new non-verbal language that has been developed for the emerging electronic line of sight badge communication. The language will be referred to in the document as NVP which an abbreviation of Non Verbal person to person line of sight communication protocol standard. NVP is both a language and a communication protocol and this document initially describes both and then gives examples of how this is programmed and then examples or actual uses in the identified markets.

Figure 1:
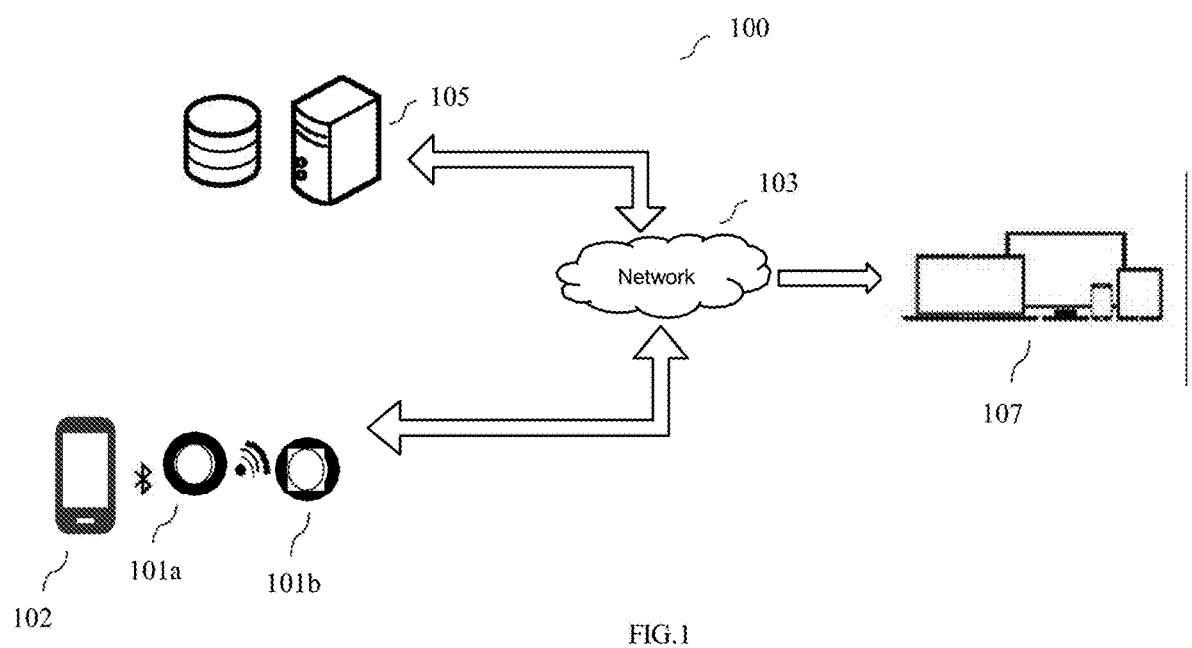
FIG. 1 illustrates a network diagram of the NVP communication system in accordance with an aspect of the invention.

Exemplary Environment:

Now in reference to FIG. 1. FIG. 1 illustrates an exemplary system environment 100 in which various embodiments of the non-verbal line of sight communication protocol system (NVP) can be practiced. In accordance with an exemplary embodiment, the NVP system 100 comprises: an interactive badge device 101a, 101b with a line of sight device visual display; the device visual display being at least one of a surround device display and, or a center device display; a processor; a non-transitory storage element coupled to the processor; encoded instructions stored in the non-transitory storage element, wherein the encoded instructions when implemented by the processor, configure the system 100 to: upload NVP interaction rules and curated NVP content for display on any one of a first user's interactive badge device 101a based on the first user's interaction rules and scheduler criteria; send at least one of an interaction and, or content message based on the first user's interaction rules and scheduler criteria to at least one of a second user's interactive badge device 101b within range and contingent on the second user's interaction rules; and based on the second user's interaction rules, accept or deny the first user interaction message, and if accepted, decode a unique tag to trigger a unique digital event, wherein the digital event may be at least one of an image, video, sound, vibration, flash, signal, symbol, color, text, sequence, upload, download on any one of the user's device visual display and, or over a network.

The network 103 may be any suitable wired network, wireless network, a combination of these or any other conventional network, without limiting the scope of the present invention. Few examples may include a LAN or wireless LAN connection, an Internet connection, a point-to-point connection, or other network connection and combinations thereof. The network 103 may be any other type of network that is capable of transmitting or receiving data to/from host computers, personal devices, telephones, video/image capturing devices, video/image servers, or any other electronic devices. Further, the network 103 is capable of transmitting/sending data between the mentioned devices. Additionally, the network 103 may be a local, regional, or global communication network, for example, an enterprise telecommunication network, the Internet, a global mobile communication network, or any combination of similar networks. The network 103 may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The network 103 may include any software, hardware, or computer applications that can provide a medium to exchange signals or data in any of the formats known in the art, related art, or developed later.

In a preferred embodiment, the line of sight interactive digital badge device (badge device) 101a, 101b is worn on one or more body parts of the user, such as chest, wrist, waist, neck, arm, leg, abdomen, thigh, head, etc. Further, the badge device 101a, 101b may be a wristband, a watch, an armband, a necklace, a headband, an earring, a waist belt and, or a ring.

Alternatively, the badge device may be any reconfigurable display that may be temporarily or permanently affixed onto a garment of a user. In yet other alternative embodiments, the reconfigurable display may be a flexible OLED tube or screen interwoven into the fabric of the garment. Badge devices 101a, 101b may have a device visual display that is situated in any one of a person's line of sight. The device visual display may be a single center display, wherein the symbol and, or color-coded visual display cueing a permission to approach and further interact is displayed on the single, center visual display. The same single, center visual display may also display the NVP content. The same display may also be enabled for touch-screen interactivity. Mother embodiments, interaction with the display contents may be controlled by controls disposed on a side, top, or bottom wall of a (circular or square) device casing. In yet other embodiments, the device visual display may be comprised of a dual display: a center device display and a surround device display. Each display sharing display functions or having unique display functions. For instance, in some embodiments, the surround device display may display the symbol and, or color-coded visual cues encoding for a permission to approach and interact, while the center device display may strictly display the actual NVP content (a static or a rolling line of user-content images).

In some embodiments of the badge device 101a, 101b, sensors may be disposed within the (domed) device housing, or on the (circular or square) device casing, to capture at least one of a user environmental or contextual data to further inform a user mood, emotion, physical condition, mental well-being, and, or willingness to be approached by other digital badge users for further interaction. The digital badge device 101a, 101b is first sent to the mobile communication device 102 and thereby, sent to the processing unit over the network 103. The digital badge device 101a, 101b communicates with the mobile communication device 102 over a short range wireless communication medium, such as Bluetooth, etc. In other embodiments, sensor input may be derived from devices other than the badge device 101a, 101b. Device input may also encompass the sensor-captured raw data input or transduced and processed data input from any other device associated with the user, such as devices worn, mobile devices, and, or fixed-access devices, such as Internet-of-Things devices (e.g. smart thermostat, home automation consoles, etc.). The plurality of device inputs provides additional input for aggregation and behavior profiling, thus layering the behavior profile with additional context for generating a higher fidelity of user mood, emotion, well-being, etc. This higher resolution of user profiling may update the user interaction rules and, or policy for determining access for approach and activating further digital event/content interaction.

In continuing reference to FIG. 1 and the exemplary environment of the NVP system, a mobile communication device 102, such as a smart phone, is a portable device that has the capability of communicating over the network 103, presenting dashboard provisioning based on a respective digital badge device 101a, 101b pairing. Examples of the mobile communication device 102 include, but are not limited to, a smartphone, a tablet, a personal digital assistant (PDA) and a mobile phone. The mobile communication device 102 may be paired with a respective digital badge device 101a, 101b over a short range wireless communication medium.

Examples of the short range wireless communication medium include Bluetooth, ZigBee, Infrared, Near Field Communication (NFC) and, or Radio-frequency identification (RFID). Likewise, the digital badge device 101a, 101b may interact with other digital badge devices 101a, 101b using a short-range communication protocol, such as Infrared, Bluetooth, ZigBee, NFC, and, or RFID.

Preferred embodiments may include the addition of a remote server 105 or cloud server to further provide for back-end functionality and support. The server 105 may be situated adjacent or remotely from the system 100 and connected to each system 100 via a communication network 103. In one embodiment, the server 105 may be used to support user behavior profiling; user history function; predictive learning/analytics; alert function; network sharing function; digital footprint tracking; e-commerce/advertising platform support, etc. The remote server 105 may be further configured to authenticate the user and retrieve data of the user, device, and, or network and applies the data against a library of validated user information for enabling a payment or ticket transaction at a fixed-access point deploying an embodiment of the interactive badge device 101a, 101b.

Figure 2:
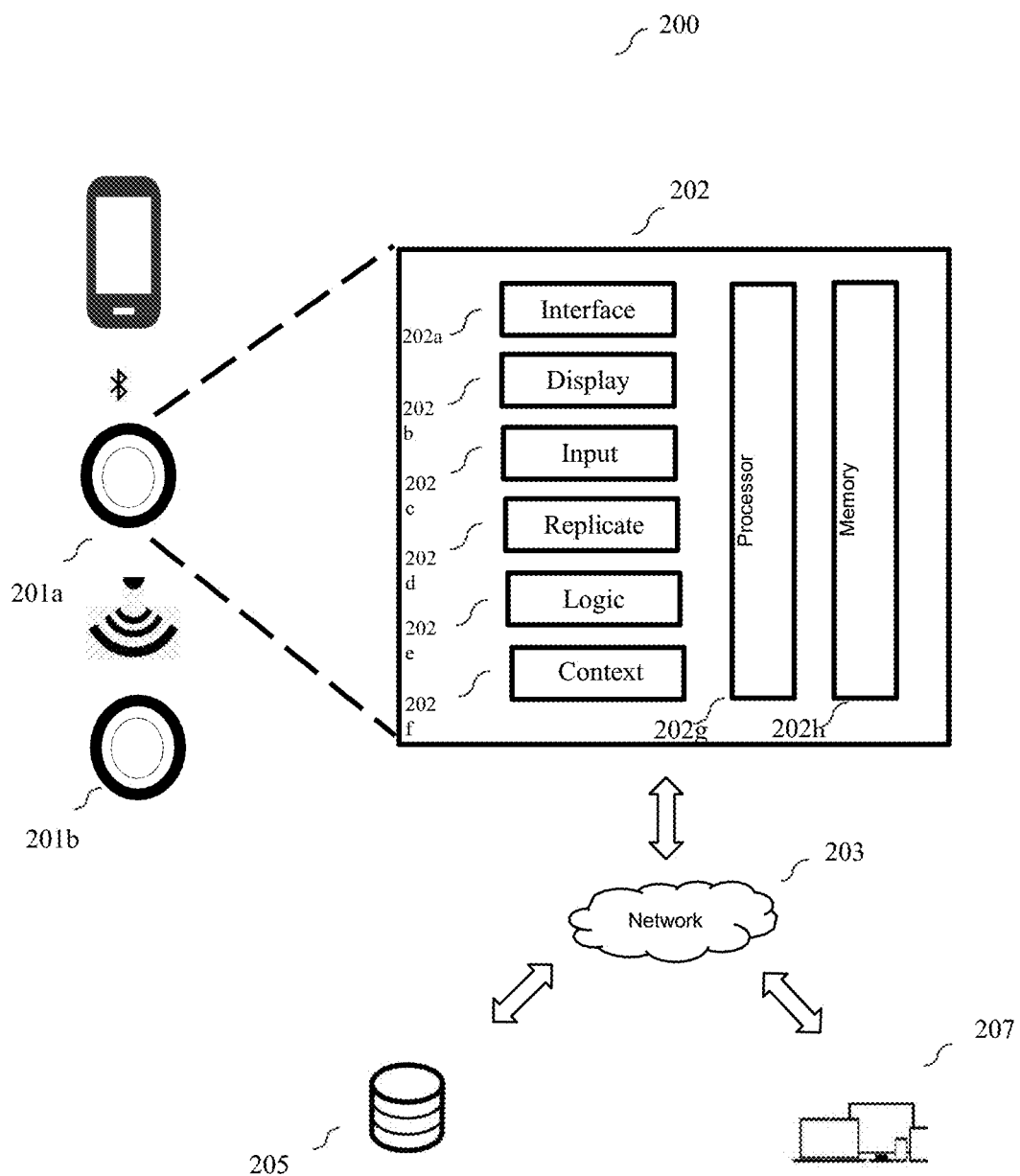
FIG. 2 illustrates a block diagram of the NVP communication system in accordance with an aspect of the invention.
Figure 3:
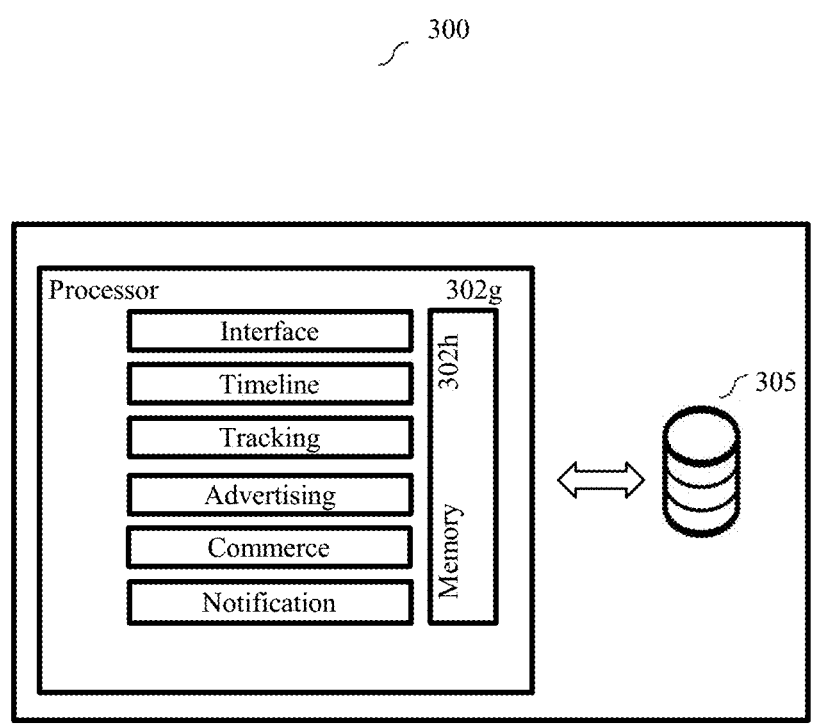
FIG. 3 illustrates a block diagram of the NVP communication system in accordance with an aspect of the invention.

Now in reference to FIGS. 2 and 3. FIGS. 2 and 3 both illustrate an exemplary embodiment of the NVP system. FIGS. 2 and 3 illustrate an exemplary processing unit 202g, 302g used for displaying a visual cue for permission to approach and, or a content display for exchange between interactive badge devices 201a, 201b or sharing over a network 203. As shown, the processing unit 202g, 302g may be communicatively coupled to at least one of an interface module 202a, display module 202b, input module 202c, replicate module 202d, a logic module 202e, a context module 202f, an interface module, a timeline module, a tracking module, an advertising module, a notification module, and a commerce module. The processor 202g, 302g may also communicatively coupled to a remote database 205, 305 and a memory 202h, 302h.

In an embodiment of the present invention, the processor 202g, 302g includes a notification/alerting module. The notification/alerting module is configured to generate reports at regular intervals (such as daily at 12:00 PM, weekly and monthly), on-demand when the user requests for a report corresponding to the user), or when triggered by a digital event. Typically, a digital event may be defined as any digital display for badge-badge display or network sharing or server authentication. The notification/alerting module may double up as a tracking module, wherein a user may keep track of his or her physical displays and interactions, as well as his or her virtual displays and interactions. In an embodiment of the present invention, the notification/alerting module may also be configured to send a notification to the user of the growing social influence of a user. In other words, an influence metric may be pushed quantifying how may people I have interacted with, and how many times my virtual NVP line of content been shared with other users on social media. The notification may be a message, a phone call or any other communication means.

In an embodiment of the present invention, the processor 202g, 302g includes a timeline module. The NVP line of content may be displayed or pushed in at least one of a static, dynamic and, or scheduled fashion on at least one of the user's center device display based on at least one of the user's scheduler criteria. The line of static, dynamic, and, or scheduled images and, or video NVP content from at least one of the user's to be displayed on at least one of the user's center device display may be curated by the user, pre-set, or dynamically pushed based on any one of user parameter. In some embodiments, the timeline module enables the displayed line of static, dynamic, and, or scheduled images and, or video NVP content to be further replicated on at least one of a digital and, or virtual presence of at least one the users. In other words, the timeline module enables the displayed line of NVP content to be further shared with social media and digital media outlets, over a network. In some embodiments, an Application Programming Interface may be integrated and configured for enabling transfer and, or further interaction of the replicated line of static, dynamic, and, or scheduled images and, or video NVP content.

The processor 202g, 302g may include an advertising module and, or a commerce module, enabling advertisers to target users for NVP content display based on NVP activity or influence of said users. The advertising module may further comprise a bidding module, wherein the advertisers bid among each other for engaging a user for incorporating a winning bid advertisement into the NVP content display of the user. The processor 202g, 302g may further comprise a commerce module, wherein users may purchase digital downloads of NVP content for NVP content display. The commerce module may further be coupled to a distributive digital ledger, wherein each NVP exchange among any user is represented as a unique node in the digital ledger. Each node tagged with meta data facilitating at least one of a transaction, validation and, or registration for each NVP exchange.

In some embodiments, any one of the processor functioning mentioned above may be off-loaded to the processor of the mobile device and, or the remote server. The device display may simply be used for display function—for both symbol and color-coded display cues on any one of the surround display and, or center display, and NVP line of content on the center display.

Exemplary Communication Protocol

The NVP language is made up of symbols, shapes, colors and images that when combined form a language specifically for the person to person or groups of people interactive badge or screen market. This language is the only language that allows individuals to communicate with the interactive badge in a visual sense. The NVP may be displayed on a surrounding of the interactive badge device and, or on device center display. In some embodiments, the surround display and center display may be combined in unison, or in a sequential manner, to express the NVP language.

The NVP Language Components

Figure 4:
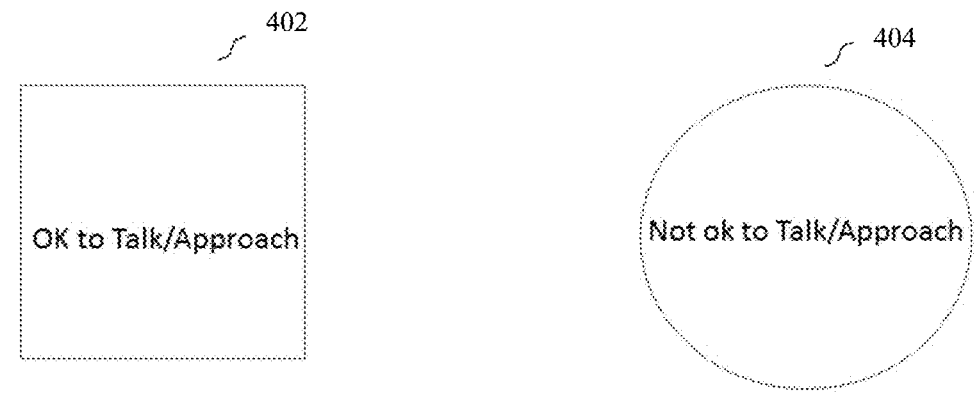
FIG. 4 illustrates a symbol and, or color-coded NVP communication protocol in accordance with an aspect of the invention.

The first component of the language is a shape such as but not limited to a square, circle, triangle or star. These shapes indicate to the viewer a behavioral welcoming state of the person viewing them. One such behavioral state might be a welcome to communicate or not as the case might be. An example of these shapes and their uses are shown in FIG. 4. This first component forms the frame of all the communication symbols to follow. It is programmed by the NVP wearer at the start of a badges or screen or display wearing session.

Figure 5:
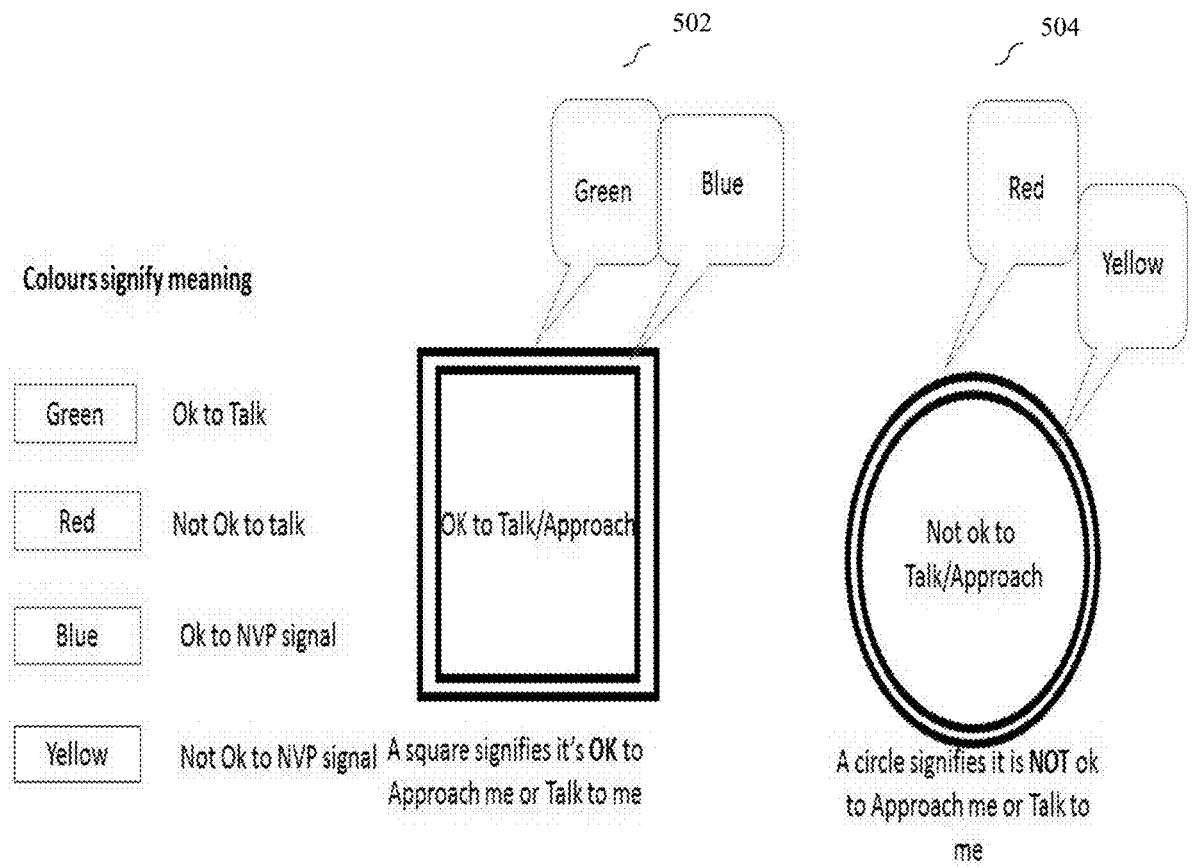
FIG. 5 illustrates a symbol and, or color-coded NVP communication protocol in accordance with an aspect of the invention.

The second component of the NVP is the color of the first component. This color signifies the rules of communication and engagement with the wearer and the receiver. The color signifies whether a person is willing to accept a communication and what type of communication from the viewer. The color can be part of the symbol or a color displayed on or around the badge An example of this is shown in FIG. 5.

Figure 6:
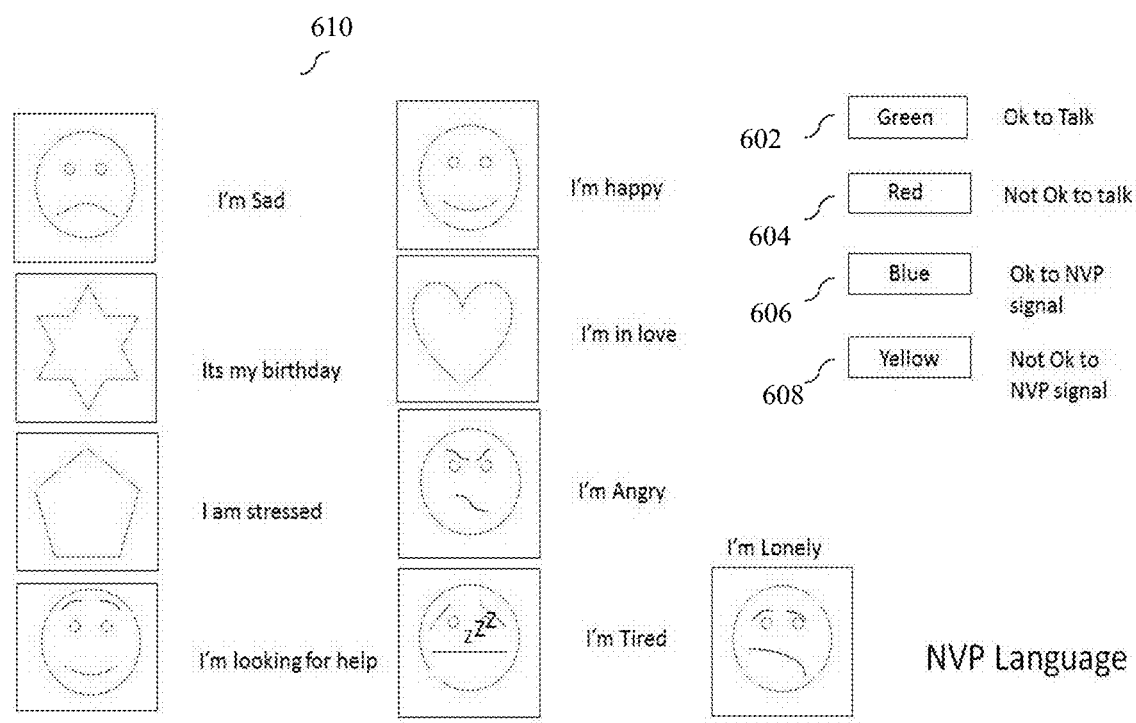
FIG. 6 illustrates a symbol and, or color-coded NVP communication protocol in accordance with an aspect of the invention.

The third component of the NVP is the symbol within the colored shape. These symbols can be anything which conveys a message to the viewer from the wearer but can only be shown using the NVP programming protocol described later. These symbols can be programmed to be shown for a certain amount of time using the NVP programming software scheduler and these symbols can also flash based on that scheduler. These symbols can be different colors based on the person's mood. Some examples of the symbols for NVP are shown in FIG. 6.

In a preferred embodiment, disclosed is a non-verbal line of sight electronic communication protocol, the protocol comprising a non-verbal symbol language for communicating wirelessly over electronic devices, including interactive badges and, or displays, between users and, or static receivers, who are in one another's line of sight; and the symbol language displayed on the interactive badge and, or display and, or static receivers communicate whether a first user can approach at least a second user or not for further digital interaction.

For instance, the interactive badge or display that is displaying a blue square 402, 502, 602, which indicates that it's ok to approach me. Inside of which a green square 606 indicates its ok to talk to me and send me a NVP communication and a lonely face 610 from the symbols show that I am lonely. This symbol is programmed to the badge using the NVP programming language software which allows for timing and scheduling. The color of the symbol is the open or closed gateway to the receiver. If the color is not correct the communication will not pass. Alternatively, in other embodiments, any combination of shapes and, or colors may be arbitrarily chosen to signify a permission to approach or activate a further digital content interaction. For instance, a green circle might suggest permission to approach, and a blue square contained therein may suggest a permission to exchange an NVP line of content. Choice of colors, symbols, and the interaction with each, may be purely arbitrary.

The NVP Programming Interface

Figure 7:
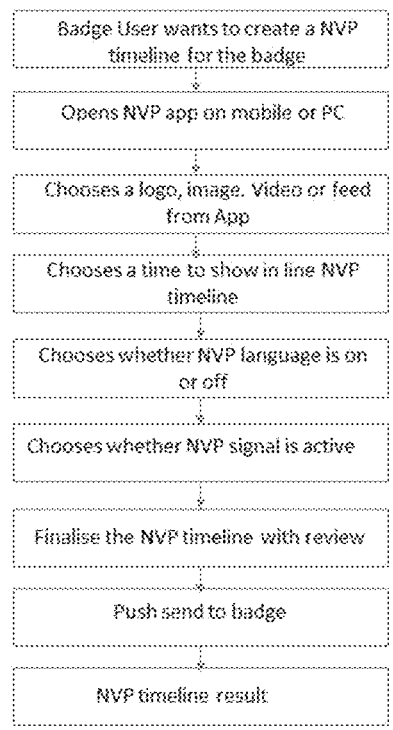
FIG. 7 illustrates an NVP content programming process flow in accordance with an aspect of the invention.
Figure 8:
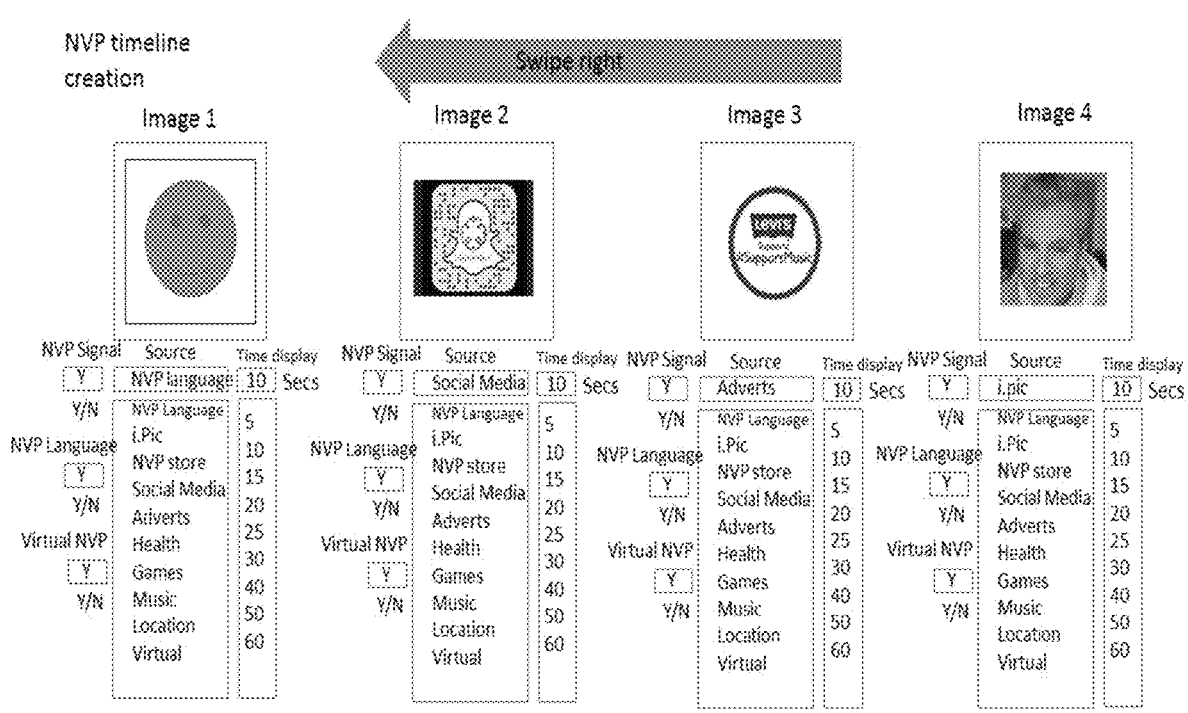
FIG. 8 illustrates a screen shot of a scheduler criteria in accordance with an aspect of the invention.
Figure 9:
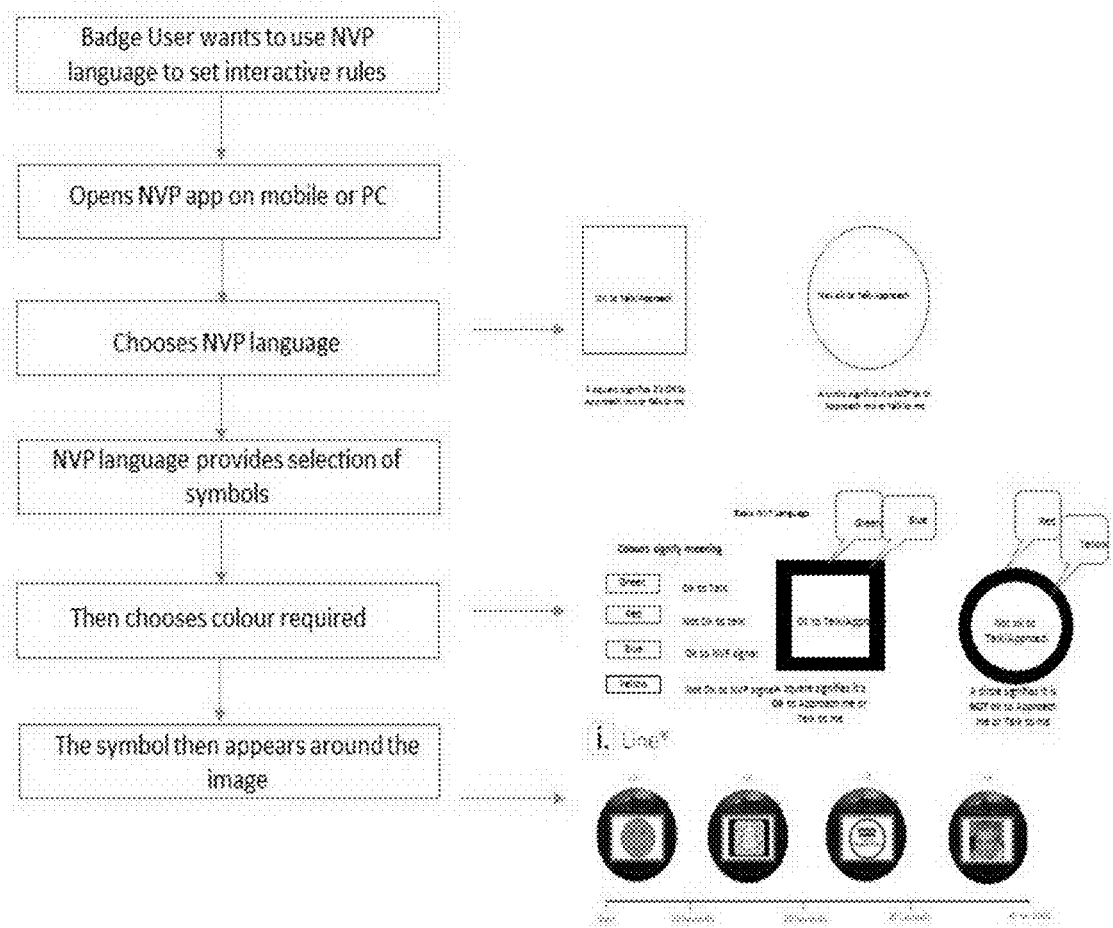
FIG. 9 illustrates an interaction rule process flow in accordance with an aspect of the invention.
Figure 10:
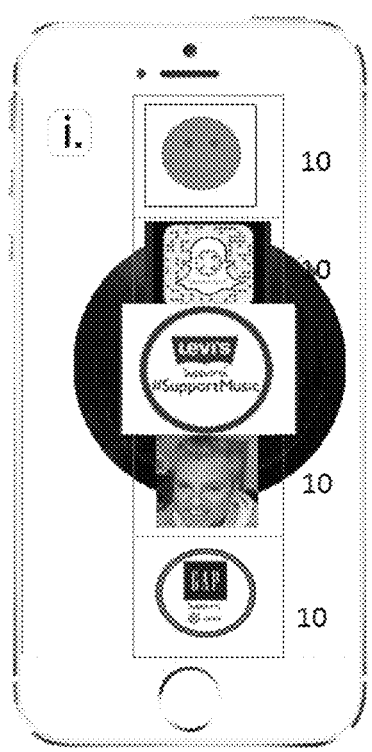
FIG. 10 illustrates a screen-shot of an NVP content display in accordance with an aspect of the invention.

To allow a wearer to program their interactive badge or personal digital display, a programming interface is required which allows the wearer to set up the language on the badge and run it throughout a day as a timeline. This requires a process which is described in detail in FIG. 7. In a preferred embodiment of the process, the wearer decides to program the badge or display with the NVP language; the program which runs on the connected device (smartphone or PC) is opened and the language variables are displayed; the NVP language components 1, 2 and 3 can be selected; the ability to send a communication to another wearer can be selected; and the ability to send the entre NVP wearers timeline can be selected. Additionally, the NVP program allows the wearer to select images from their own images, from the NVP store, feeds from interfaces with social media applications, from adverts selected from the NVP advertising platform, from health devices, from games, music and programming from a specific GPS location. Additionally, the amount of time an image is displayed may be programmed with the resulting timeline transmitted from the device to the wearable badge (FIG. 8). The process for setting the rules of interaction and engagement is further set out in FIG. 9. Once the NVP time line is set, this is transmitted to the badge and can be altered in real time. An example of this in vertical format is shown in FIG. 10. Alternatively, the line of NVP content may be depicted or scrolled in a horizontal fashion.

The NVP Communication Protocol Standard

Figure 11:
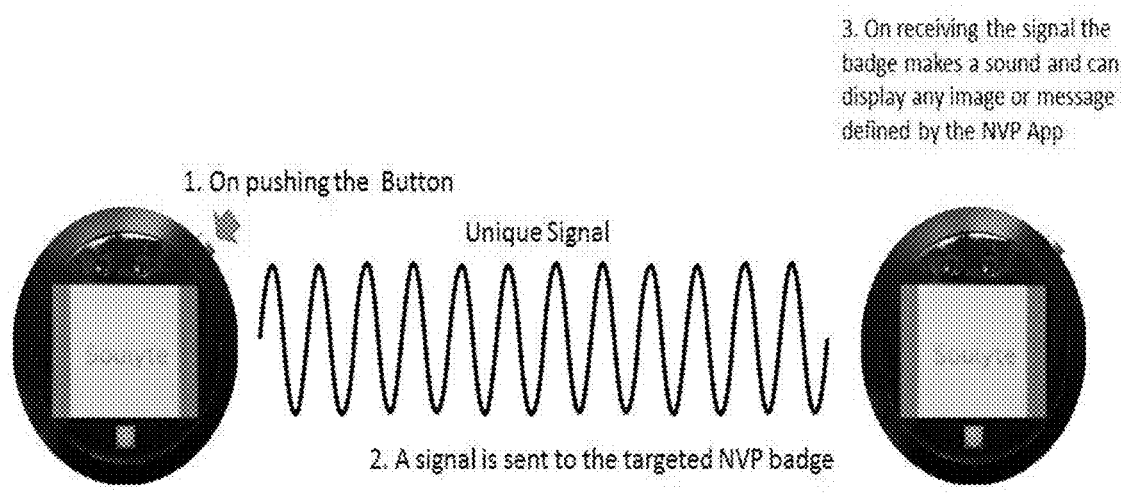
FIG. 11 illustrates a badge-to-badge interaction in accordance with an aspect of the invention.

As illustrated in FIG. 11, the NVP communication system allows one individual who is wearing an interactive badge or screen—in the line of sight of another individual wearing the same—to send messages wirelessly based on the NVP displayed. The message can only be sent if the NVP is set to the correct parameters set out in the NVP language section of this document.

The NVP protocol has a unique number attached which allows the receiving interactive badge or screen to decode it and activate an event such as but not limited to an image display, a sound played, a vibration, or a signal sent back to the sender or a signal being sent to the parent smartphone, which in turn activates an event.

This NVP signal is defined as a unique wireless signal sent from one interactive badge or screen to another over a certain physical distance in line of sight. Using the NVP signal, the interactive badge can send an NVP signal to any number of badges or receivers and the badge can accept an NVP signal from any number of badges. The NVP signal can only be accepted if the correct NVP symbols are being displayed. By accepting an NVP signal this can trigger the interactive badge or screen to display anything it's been programmed to by the NVP app running on the smartphone or PC. If accepting the NVP signal this can trigger a sound or vibration or cause a device to trigger a sound or device. On accepting the NVP signal this can trigger the NVP app running on the smartphone to activate an event or process. On accepting the NVP signal, this can trigger the interactive badge or screen via the NVP app to display a set of offers, images, videos or sounds.

In a preferred embodiment, a non-verbal line of sight electronic communication protocol is disclosed, the protocol comprising: a non-verbal symbol language for communicating wirelessly over electronic devices, including an interactive badge with a line of sight device visual display, between users who are in one another's line of sight; the symbol language further comprising a set of any shaped and, or colored symbols that are programmably displayed on the device visual display, wherein the device visual display is at least one of a surround device display and, or a center device display; and based on the programmably displayed set of shaped and, or colored symbols on the device visual display, communicate whether a first user can approach at least a second user or not for further digital interaction.

The technology used to send and receive the NVP signal can be at a specific frequency with a unique number. This has the effect of making any other device not able to recognize the NVP signal or be able to manage the events that have been set by parameters with in the App. This unique number and encryption method makes the NVP interactive badge or screen only recognizable with another NVP interactive badge or screen or receiver or a licensed piece of hardware and software from the NVP group of products. This will be a critical area of protection for the NVP language and protocol—as without it—other manufacturers will not be able to enter the market as people will not be able to interact with their badge. The NVP language is the standard for interactive badges and devices. In short, the NVP signal can be a visual equivalent of a click through.

The Virtual NVP Line

Figure 12:
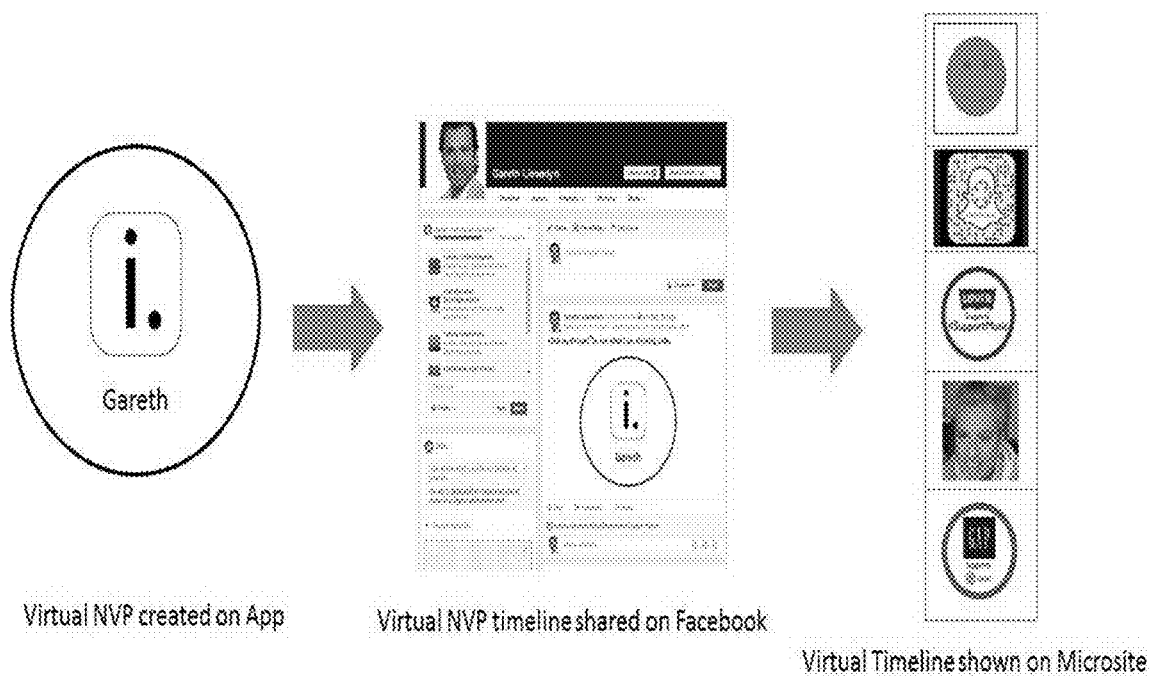
FIG. 12 illustrates an NVP content flow in accordance with an aspect of the invention.

FIG. 12 illustrates the transition from badge 1 display; share with badge 2; and digital media share of badge 1 display with tracked footprint (badge 2 share). Virtual NVP is the digital version of the visual NVP line shown on the interactive badge or screen that can be made available to NVP badge users so they can see what others are displaying on their NVP badges that day. There are two uses for the Virtual NVP line: 1) to allow NVP badge wearers to transmit their NVP line from one user to another; and 2) to allow NVP badge wearer to attached their own.

The pre-defined presentation of the content message on at least the interactive device visual display and, or virtual profile may be configured for network or digital sharing. Furthermore, the virtual profile may, via an Application Programming Interface, be configured for transfer and, or further interaction—such as geo-location, site check-in, etc. In other embodiments, the NVP system has been developed so there is a very low entry point for integration to the program. In fact, as the user is only taking a screen shot of their phone for any media there is no integration with $3^{rd}$ parties necessary. By way of an example, a user could construct a NVP line of their Facebook post, Twitter post, dashboard from Fitbit, images from their phone and a mood image. All of these can be taken directly from screenshots with no outside integration from developers needed. These screen shots can be real time based on the time of NVP line creation.

In some embodiments, live data feeds from monitoring devices would be image related, so rather than display on the device, a mirroring program would allow the device display to be shown on the NVP badge via Bluetooth. This NVP 'Llego' block is a universal interface to all monitoring and real time feed devices.

As each person is responsible for their own NVP line they are responsible for the content that is published. However, the NVP system has a safe guard to ensure that inappropriate and copyright content is not displayed. Each time an NVP line is created it must pass through the NVP 'Llego' Block server to pick up any illegal images. If this happens, the NVP line will be rejected and the user asked to review the images. The NVP 'Llego' block interface allows media channels to display their content on the NVP badge if the user so wishes. These channels are passed through the NVP Llego block centrally and are available for users to connect to if they so wish using the NVP line creation software. There are many markets for the NVP interactive language and its communication protocol. The application that follow are just some examples.

Application 1:

Advertising Targeting

Figure 14:
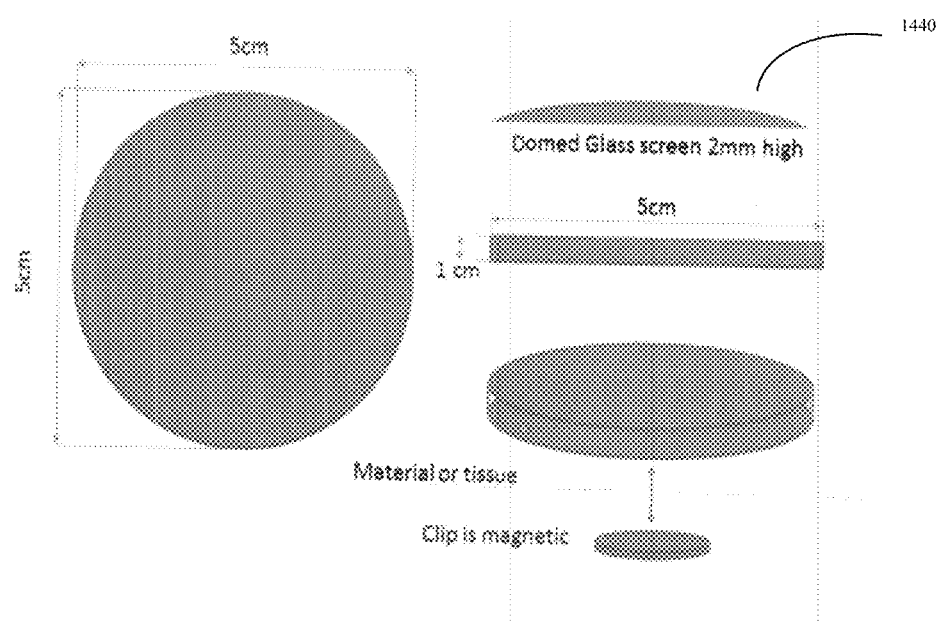
FIG. 14 illustrates exemplary dimensions of the line-of-sight device in accordance with an aspect of the invention.

The groups are based not on where you are digitally i.e. Facebook or Twitter but where you are physically i.e. on a train, at a concert, at a bar or at work. We will be able to count how many NVP signals were sent to individuals and what they reacted to. In this way new physical influencers will emerge, i.e. those who are the most popular. These peoples virtual NVP lines will be the most desirable from an advertising perspective as they will enhance their online profile with that running on their interactive badges or screens. The diagram in FIG. 14 shows what might typically happen to a person wearing and actively using the NVP language on a daily basis.

Figure 13:
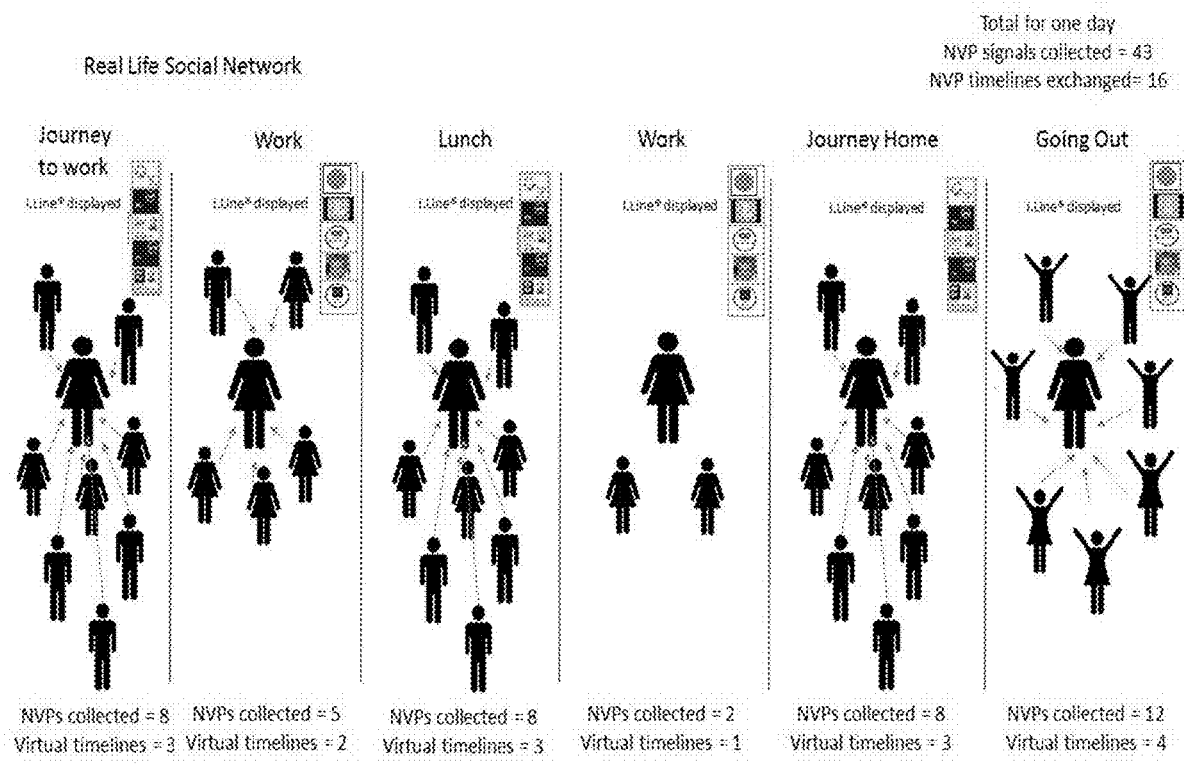
FIG. 13 illustrates an NVP influence map for ad-targeting in accordance with an aspect of the invention.

As illustrated in FIG. 13, girl A has collected 43 NVP signals and had 16 conversations about the NVP line she is displaying. If she has configured her NVP line correctly each person who has sent an NVP signal will have received her Virtual NVP Line. which was reacted to. Note that girl A had configured two NVP lines for different parts of her day. So different people will see different NVP line. What is clear is that as the NVP language and communication protocol becomes established the number of transactions will grow exponentially as each of the above people will have their own NVP badge and their own NVP line We will quickly see the emergence of the top real-life influencer in a daily basis. Advertisers will be able to target the most popular real time influencers based on NVP sharing activity.

In other embodiments, the advertising module or platform may further comprise a bidding module, wherein the advertisers bid among each other for engaging a user for incorporating a winning bid advertisement into the content message display of the user. Advertisers will be able to use the NVP Real Time Bidding Network to get access to the NVP line of targeted individuals if they have given their consent to take advertising in their NVP Line. These adverts will be clickable on the Virtual NVP line so they can be transferred from one user to many in the Real Life Network®. This potentially gives advertisers a major new network of people to target based on their location.

Application 2:
The NVP Store or Shop Controlling the NVP Content

Images will be able to be taken from a person's phone and shown on the NVP badge. As these are put onto the NVP line through the NVP App, we have control over the content and can manage any indecent, or inflammatory content. However, the final say will be with the NVP badge wearer. We will have complete control over the Virtual NVP line and be able to stop the distribution of any indecent or inflammatory content. Additionally, there will be a place to purchase widgets that link directly to apps such as Facebook, Twitter and other apps that have integrated with our NVP Llego Block. Brands, Apps and advertiser will have to pay to be allowed on the portal and be subject to our terms and conditions. We expect this fee to be a % of any purchase price or a fixed fee based on an individual's use. i.e. if the wearer wants to buy a specific logo or album cover, they can buy this for a one-off fee from the supplier. We would retain 10% of the retail revenue. This logo would be allowed to be used on the individuals NVP badge, but not be transferable to another person NVP Line via the virtual NVP line which is read only.

The payment transaction system may incorporate block chain technology, wherein each NVP exchange or digital content purchase transaction among any user is represented as a unique node in the digital ledger, each node tagged with meta data facilitating at least one of a transaction, validation and, or registration for each NVP exchange or digital content purchase transaction. Alternate payment systems may be used, including linking directly to a credit card, debit card, and, or bank account.

In yet other embodiments, payment systems may include an intermediary or $3^{rd}$ party system providing payment processing between users or between user and the NVP store. An intermediary account or escrow-type account may also be used, whereby funds are disbursed from a user 1 account to a user 2 account, or from a user 1-linked intermediary account to a user 2 account—upon full satisfaction of transaction or bidding obligations. The intermediary account may be viewed as a pre-paid account. In other embodiments, digital sellers may target users who have pre-paid an intermediary account for a specific item, thereby competing over a particular purchaser for a specific item.

Moreover, in some embodiments, the NVP communication protocol standard may be incorporated into the payment transaction system coupled to the commerce platform or NVP store. For instance, a yellow square on the surround display or center display of the interactive badge may signify that the user is willing to purchase a digital content for download or a physical item. In other embodiments, the yellow square displayed may signify that after scanning a physical item tag, the user's account or intermediary account has a sufficient balance to afford the item. Contrastingly, a red square may indicate that the item may not be purchased based on available balance. In yet other embodiments, a green circle may signify that a payment transaction is confirmed.

To run through a potential scenario, two individuals have bought an interactive badge which runs the NVP language, communication protocol and programming language. Each one has programmed their badges to run a 6-image timeline changing every 30 seconds. They both get on a train in the morning and find themselves sitting opposite one another. Individual 1 sees that individual 2 has a green square framing their timeline of images and knows that this signifies that the person is open to a conversation, is open to receiving an NVP signal and is open to receiving a virtual NVP timeline from this person. Individual 1 decides to send a NVP signal which causes the individual 2's badge to display a 'Hi', beep a sounds and flash once as this is standard for the NVP badge.

Individual 1 approaches Individual 2 and starts to discuss their images. Individual 1 also decides to send their virtual NVP timeline to individual 2. At the end of the day Individual 1 and 2 are able to read how many people have sent them a message, from whom and about what. This scenario can happen at any time of the day and the individuals can change the NVP components in real time through their App. Furthermore, individual 1 or 2 can purchase specific digital content from a coupled commerce platform to be displayed on their NVP line or virtual NVP. What's more, advertisers may target either individual 1 and, or 2 for advertising display based on individual 1 and, or 2's tracked activity.

Moral and Legal Implications:

What happens if a person approaches another person in direct contradiction to the symbol being displayed? There needs to be method of creating sanctions or no-go areas. One component of the moral code is to set a rule saying that if a person is reported more than 3 times for infringing the person space their badge and account will be suspended. But what happens if the person does not have a badge and approaches the person with the approach symbol anyway.

What can be done in this circumstance? This is where a moral code needs to be created or at least set out. An unwritten rule which adheres to normal law is that a person has the right to tell the person that they do not want to talk even though they have that symbol displayed.

Additionally, how much personal information can be displayed on the interactive badge without it causing someone offence and who is monitoring, censoring and controlling this content? Through the app, we are able to control what is displayed on the device, but this requires monitoring at the server side and will require human intervention. Again, this is where the moral code component of the ecosystem comes into play. The alternative is to let the general public publish what they like on their own badges or displays. If this is offensive, is it covered under the relevant laws of the country? How much control should we exercise over the content displayed in public? Every badge sold should have an ethics card included which states our ethic culture and what can and cannot be displayed. If anyone is shown to be contravening, it would be seen as contravening badge sub-culture or badge mores.

FIGS. 14-23 illustrate device, process, and method flow diagrams for a device housing worn over a user configured for line-of-sight display of programmable content from a second device. The line-of-sight device (locket) with a housing may be configured for line-of-sight display of a first device, operably coupled to a second device for any programmable content to be consumed via the line-of-sight display. It will be appreciated by a person of ordinary skill in the art that the programmable content may be reconfigurable based on a pre-defined line-of-sight rule.

Preferably, the line-of-sight rule may mediate programmable content that may be at least one of shaped and, or colored symbols on the first devices visual display, communicating whether a user can approach at least another user or not for further digital interaction via the line-of-sight display. In yet other embodiments, the approach message via the line-of-sight display may include a standardized audio cue.

Figure 15:
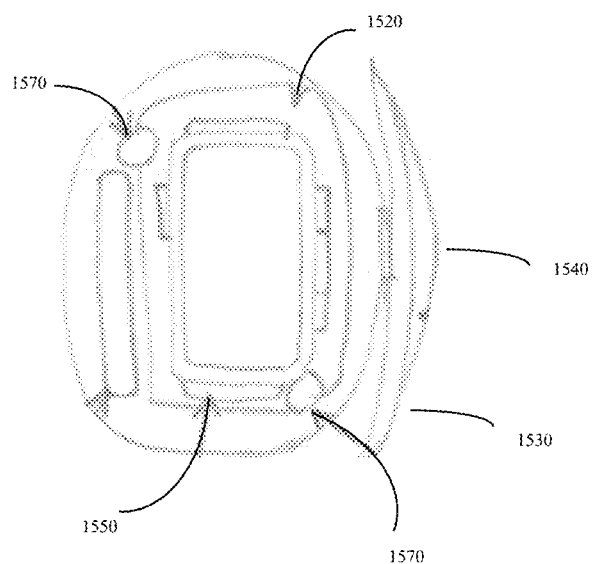
FIG. 15 illustrates a line-of-sight device in accordance with an aspect of the invention.
Figure 16:
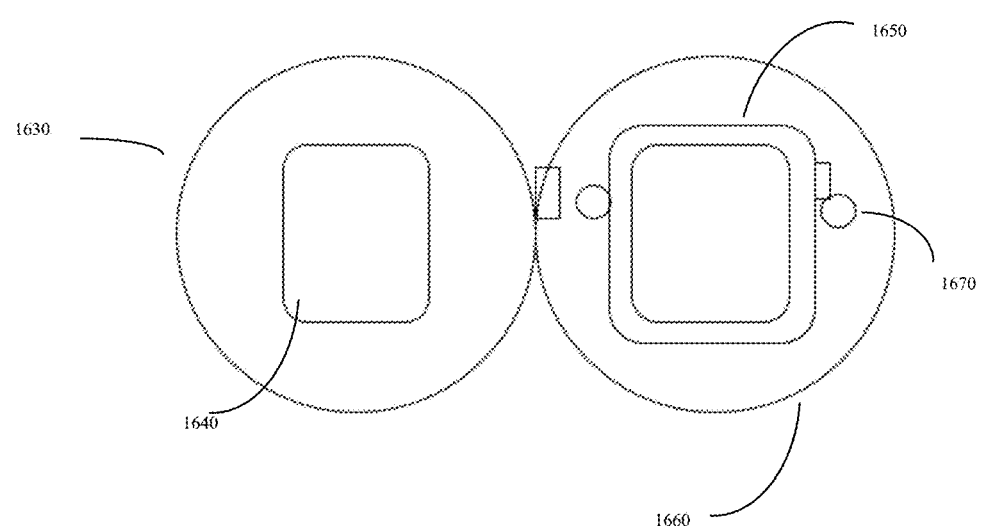
FIG. 16 illustrates a line-of-sight device in accordance with an aspect of the invention.

FIGS. 15 and 16 illustrate a front perspective view of a device configured for housing a first device for line-of-sight display in accordance with an aspect of the invention. FIG. 14 illustrates exemplary dimensions of the housing of the line-of-sight device. In one embodiment, a line-of-sight wearable device worn over a chest of a first user comprises a housing defining at least a first electronic device storage location 1520; a front wall 1530, 1630 on the housing having at least a portion 1440, 1540, 1640 to expose a display of the first electronic device 1550, 1650; a back wall on said housing configured to open to removably secure the first electronic device 1550, 1650 within the at least first electronic device storage location 1520; and the first electronic device 1550, 1650 that is pair-able wirelessly with a second electronic device, wherein at least one of a display or audio event on the first electronic device 1550, 1650 is caused programmably based on a pre-defined line-of-sight rule and the at least one of the display or audio event is exposed in a line-of-sight to at least a second user via any one of the walls of the housing worn over the chest of the first user.

In a preferred embodiment, the front wall 1530, 1630 may have at least a portion 1440, 1540, 1640 of the display configured to maximize display of the first electronic device 1550, 1650 display. The display portion 1440, 1540, 1640 may be a glass hemispheric dome 1440 covering the entire surface of the front wall 1530, 1630. In other embodiments, the display portion 1440, 1540, 1640 may be a flat glass screen covering the entire face of the front wall 1530, 1630. In other embodiments, a hemispheric dome 1440 or flat glass may just expose an amount required to display the first electronic device 1550, 1650 display. In yet other embodiments, the display portion 1440, 1540, 1640 may be a cut-away or through-wall of at least a dimension required to display the first electronic device 1550, 1650, and yet ensure that the first electronic device is securely stored within the housing.

As shown in FIGS. 15 and 16, a medium for enabling a short-range communication protocol 1570, 1670 between at least a coupled of devices is disposed on the back wall 1660 of the housing. The mobile communication device, such as a mobile phone (second electronic device), may be paired with a smart watch or another type of mobile communication device (first electronic device) using any protocol. In a preferred embodiment, the medium 1570, 1670 is an infrared sender and receiver for enabling the pairing between the at least couple of devices, such as the mobile phone and smart watch. Any person of ordinary skill in the art can appreciate that any number of protocols and mediums may be exploited to facilitate the pairing of the smart watch and mobile phone. Examples of the short range wireless communication medium include Bluetooth, ZigBee, Infrared, Near Field Communication (NFC) and, or Radio-frequency identification (RFID). Likewise, line-of-sight devices may interact with other line-of-sight devices using a short-range communication protocol, such as Infrared, Bluetooth, ZigBee, NFC, and, or RFID. In similar fashion, a person of ordinary skill in the art may also appreciate the fact that any number of small form-factor devices with high-order processing and a display may be used as the first electronic device 1550, 1650 housed with the line-of-sight device, without departing from the scope of the invention.

While not shown in FIG. 16, FIG. 15 shows an exemplary location in which the first electronic device 1550, 1650 may be docked. Embedded within the housing of the line-of-sight device is a first device storage location 1520. The first electronic device may be securely inserted into the storage 1520 within the device housing by unlatching or opening the front wall 1530, 1630 or back wall 1660 of the device. The front wall 1530, 1630 or back wall 1660 may open by way of a hinged latch that allows the latch to swing swing open to expose the at least one first electronic device storage location 1520 or swing close to securely close the back wall. Once opened and revealed, the first electronic device 1550, 1650 may be placed and secured back-surface down—either font-loaded (secured on the back surface of the front wall 1530, 1630) or back-loaded (secured on the top surface of the back wall 1660). The display surface of the first electronic device 1550, 1650 is positioned up, in order to expose the display via the display portion 1540, 1640 of the line-of-sight device. In other embodiments, the line-of-sight device may not have a front wall 1530, 1630 or back wall 1660 that unlatches or opens, but rather, accepts the first electronic device 1550, 1650 via a slot (not shown) on a top wall of the line-of-sight device. The user may slide the first electronic device 1550, 1650 into the top wall slot in such a fashion so as to expose the first electronic device 1550, 1650 display via the line-of-sight device display portion 1540, 1640. In such an embodiment, the back surface of the first electronic device 1550, 1650, such as a smart watch, may still be facing the back wall 1660 of the line-of-sight device. Furthermore, the smart watch or any first electronic device 1550, 1650 may be removed by lifting or press-releasing the overhang portion of the smart watch housing or strap from the top wall slot of the line-of-sight device. In yet other embodiments, the first device or smart watch 1550, 1650 may be inserted through a through-wall on the front wall 1530, 1630 or back wall 1660 for securing into place, obviating the need for inserting into a top wall slot or opening to separate the front wall 1530, 1630 from the back wall 1660, 1760 for front-loading or back-loading. The person of ordinary skill in the art may appreciate that any number of alternate methods for revealing the storage location 1520 for docking the first electronic device 1550, 1650 may be possible.

Figure 17:
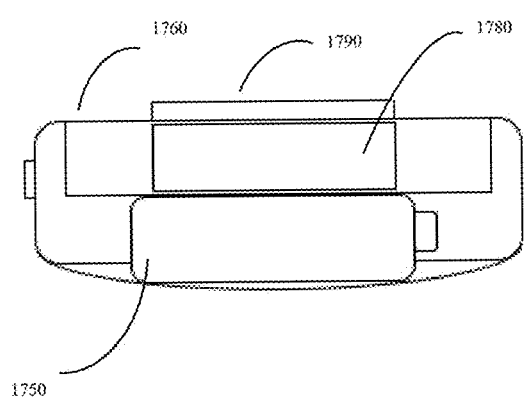
FIG. 17 illustrates a line-of-sight device in accordance with an aspect of the invention.
Figure 18:
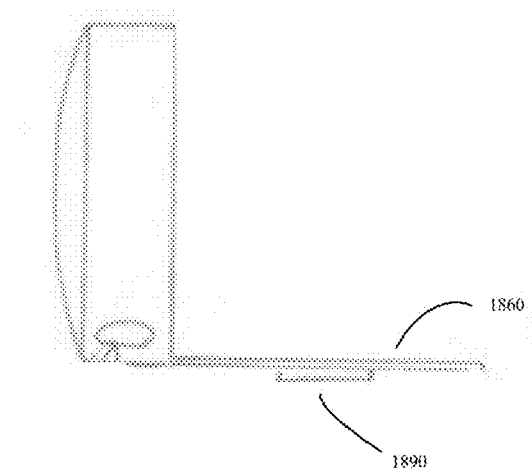
FIG. 18 illustrates a line-of-sight device in accordance with an aspect of the invention.

FIGS. 17 and 18 illustrate a top perspective view of the line-of-sight device in accordance with an aspect of the invention. Once the first electronic device 1750 is docked or housed within the first electronic device storage location, it may be secured by any number of methods. As shown in FIGS. 17 and 18, the first electronic device 1750 (smart watch) is secured in place by a magnet 1790, 1890 disposed on the back wall 1760, 1860 of the line-of-sight device. In other embodiments, the magnet 1790, 1890 may still be disposed on the back wall 1760, 1860, but within the line-of-sight device housing. In such embodiments, the magnet 1790, 1890 may be positioned forward or rear of the line-of-sight device circuit board 1780. In yet other embodiments, the first electronic device 1750 may be secured within the storage location by any one of a clip, thread, slot, etc.

As shown in FIGS. 17 and 18, the housing of the line-of-sight device is in a circular shape of roughly 6 cm in diameter. This dimension is roughly the smallest form-factor to accommodate a smart watch as the first electronic device 1750. However, any sized circular device or housing may be used to effectuate display of any type of a first device 1750, without departing from the scope of the invention. Moreover, the device or housing may be configured in any one of a substantially square, circular, rectangular, or triangular shape, wherein corner edges are round or sharp and planar surfaces are any one of flat, concave, convex, or hollow (through-walled).

Though not shown in FIG. 17 or 18, the line-of-sight device may be configured in the form of a locket, wherein the locket is coupled to a strap to be worn over a neck of the user. By being worn over the neck of the user, the line-of-sight device may be positioned over the chest of the user for optimal display to any other user within eye-shot. Any number of methods for positioning the line-of-sight device to optimize line-of-sight display to at least a second user may be employed, without departing from the claimed invention. For instance, the line-of-sight device may not be coupled to a strap, but rather, be simply clipped, adhered, magnetically adhered, or fastened to a shirt over the chest of the user. In other embodiments, the line-of-sight device may be clipped, adhered, magnetically adhered, or fastened to a hat or head-wear worn over the head of the user. In yet other embodiments, the device may be embedded or woven into a fabric of any one of a shirt and, or hat of the user.

Figure 19:
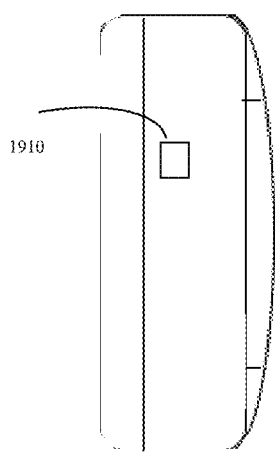
FIG. 19 illustrates a line-of-sight device in accordance with an aspect of the invention.
Figure 20:
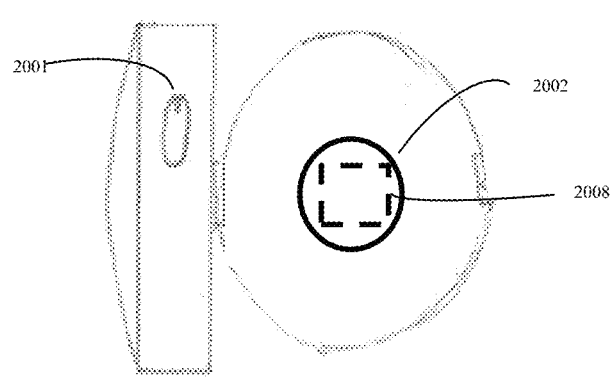
FIG. 20 illustrates a line-of-sight device in accordance with an aspect of the invention.

FIGS. 19 and 20 depict side views of the line-of-sight device in accordance with an aspect of the invention. As shown, on the right or left side, at around 90 degrees to perpendicular, there is a button 1910, 2010 which allows for a digital message or event from one line-of-sight device to be transmitted to at least one other proximal line-of-sight device—contingent on pre-defined rules and configurations. Not shown are two sensor housings disposed on either the front wall or back wall housing an infrared sender and receiver to enable communication between at least one of line-of-sight device to any line-of-sight device; line-of-sight device to any first device; line-of-sight device to any second device; first device to any first device; or first device to any second device. In other embodiments, the above communication scenarios may be achieved by any one of, or combination of, short-range communication protocols. The button 1910, 2010 may also double as a power on or off for the line-of-sight device.

In continuing reference to FIGS. 19 and 20, the line-of-sight device may have two power sources. The first may be contained within the housing of the device (not shown). The second may be a battery that powers the line-of-sight device connection to the second device (smartphone) via Bluetooth and, or the infrared sender and receiver (not shown). The battery has the capacity for at least a day's operation and is fully rechargeable. The line-of-sight device circuit board 2008 comprises an infra-red receiver and sender, a processor, a blue tooth wireless module, and battery management. The memory and software is programmed directly to the on-board processor. This software allows the line-of-sight device to send a user's unique identification and for the receiver's line-of-sight device to decode that unique identification and retrieve the profile data from the server.

Figure 21:
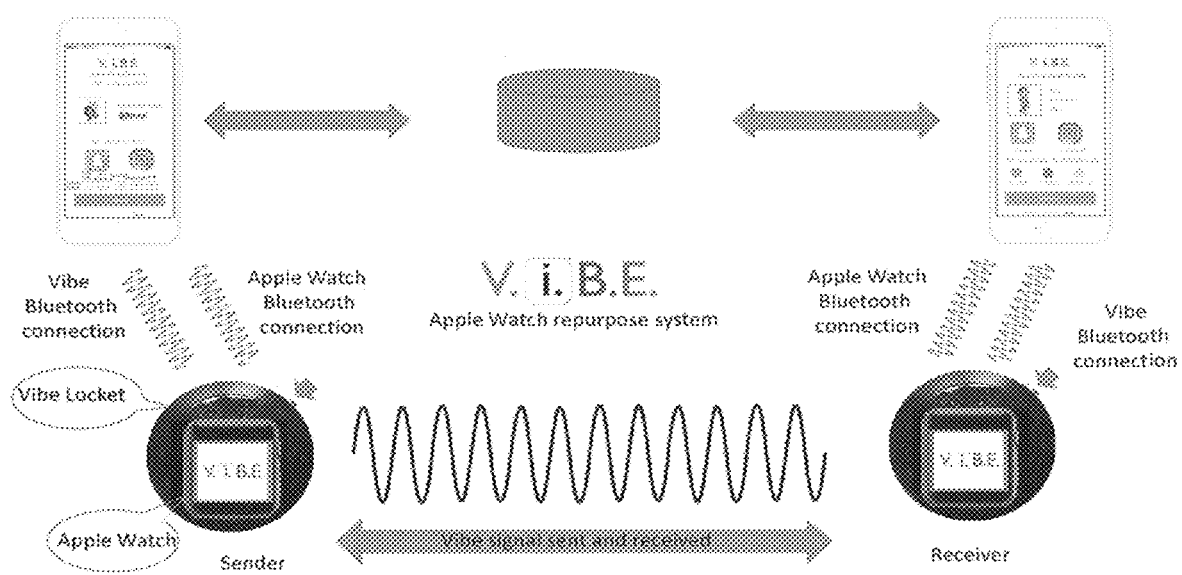
FIG. 21 illustrates a process flow for a line-of-sight display in accordance with an aspect of the invention.
Figure 22:
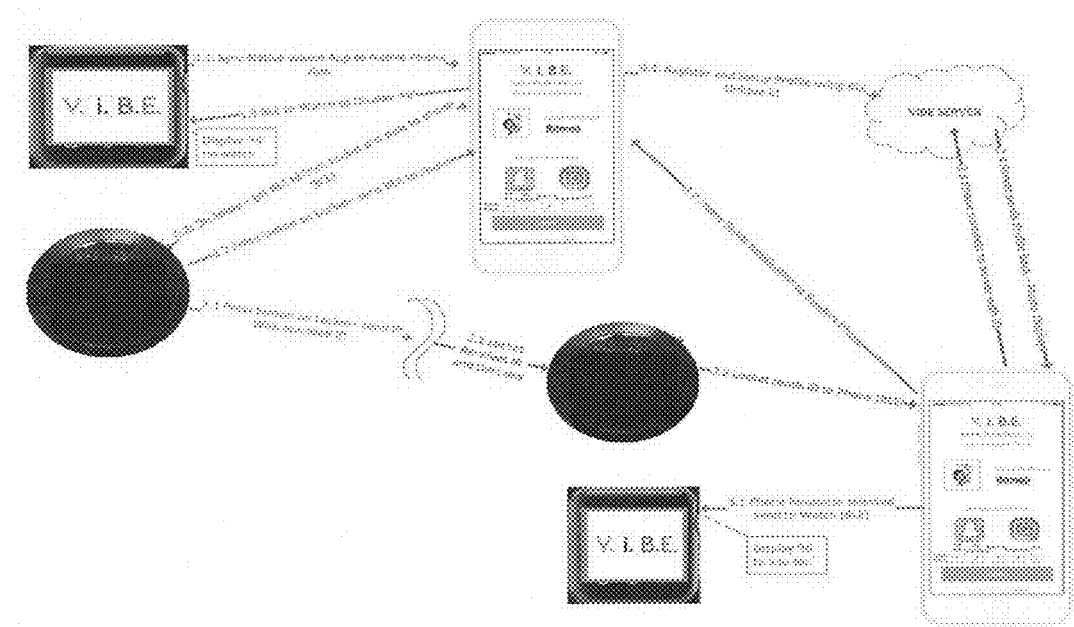
FIG. 22 illustrates a process flow for a line-of-sight display in accordance with an aspect of the invention.

Now in reference to FIGS. 21 and 22. They each illustrate an exemplary interaction or process flow between devices in accordance with an aspect of the invention. The line-of-sight device may not interact without the app on the second device (smartphone) running the protocol. The users smartphone must have the line-of-sight software running on the smartphone and the users first device (smartwatch), and optionally, the line-of-sight device must be paired with the smartphone and the line-of-sight device app. The smartphone app sends the display aspects based on the interaction to the smartwatch device. This process is not connected to the circuit board, but happens separately. The infrared module allows for sending and receiving infrared signals over a distance of 15 meters with significant accuracy. The line-of-sight device includes a directional hood that allows the infrared beam to be targeted at other users very accurately. The infrared receiver has a wide receiving angle to trap incoming signals. The infrared signal carries a 4-byte code in hexadecimal which enables the code to be coded and decoded when being sent. The send button activates the send signal for the infrared sender and this sends the users unique ID to the receiver line-of-sight device.

In continuing reference to FIGS. 21 and 22, a non-verbal line-of-sight electronic communication system is disclosed. The system may comprise a line of sight wearable device to be worn over a chest of a first user, wherein the device may further comprise a housing defining at least a first electronic device storage location with a front wall or back wall configured to open to removably secure the first electronic device within the at least first electronic device storage location, and pair-able wirelessly with the first user's second electronic device. In an exemplary embodiment, the first device may be a smartwatch and the second device may be smartphone. The system further comprises a processor; a non-transitory storage element coupled to the processor; encoded instructions stored in the non-transitory storage element, wherein the encoded instructions when implemented by the processor, configure the system to: upload interaction rules and curated content for display on the first device based on the first user's interaction rules and scheduler criteria exposed in a line-of-sight to at least a second user via the line of sight device worn over the chest of the first user; send at least one of an interaction and, or content message based on the first user's interaction rules and scheduler criteria to at least one of a second user's device within range and contingent on the second user's interaction rules; and based on the second user's interaction rules, accept or deny the first user interaction message, and if accepted, decode a unique tag to trigger a unique digital event. In a preferred embodiment, the digital event may be at least one of an image, video, sound, vibration, flash, signal, symbol, color, text, sequence, upload, download on any one of the user's first device visual display.

In other embodiments, the triggered unique digital event may be a curated line of static, dynamic, and, or scheduled images and, or video content from at least one of the user's to be displayed on at least one of the user's first device display exposed via the line-of-sight wearable device. In yet other embodiments, the displayed curated line of static, dynamic, and, or scheduled images and, or video content is further replicated on at least one of a digital and, or virtual presence of at least one the users.

In other embodiments, a line-of-sight electronic communication system may comprise a line-of-sight wearable device housing defining at least a first electronic device storage location
configured to removably secure the first electronic device; at least a short range network coupling the first electronic device and a proximal second electronic device; to trigger a unique digital event; and wherein the triggered unique digital event is at least one of curated line of static, dynamic, and, or scheduled images and, or video content from at least one of the user's to be displayed on at least one of the users first device display exposed via the line-of-sight wearable device.

The digital event triggered from the interaction rules may be a display of any combination of shapes and, or colors chosen or pre-defined to signify a permission to approach or activate a further digital content interaction on any first device or line-of-sight device. For instance, a green circle might suggest permission to approach, and a blue square contained therein may suggest a permission to exchange an NVP (user curated) line of content. Choice of colors, symbols, and the interaction with each, may be purely arbitrary or pre-defined in accordance with a standardized protocol. In order to allow a user to program at least one of their line-of-sight device, first device (smartwatch) or second device (smartphone), a programming interface is required which allows the user to set up the language and run it throughout a day as a timeline. In a preferred embodiment, the user decides to program at least one of the device, first device, or second device with the NVP language; the program which runs on the paired smartphone is opened and the language variables are displayed; the NVP language components can be selected; the ability to send a communication to another user can be selected; and the ability to send the entre NVP users timeline can be selected. Additionally, the NVP program allows the user to select images from their own images, from the NVP store, feeds from interfaces with social media applications, from adverts selected from the NVP advertising platform, from health devices, from games, music and programming from a specific GPS location. Additionally, the amount of time an image is displayed may be programmed with the resulting timeline transmitted from the device to the line-of-sight device/smartwatch. The process for setting the rules of interaction and engagement is further set out in FIG. 9. Once the NVP time line is set, this is transmitted to the badge and can be altered in real time. An example of this in vertical format is shown in FIG. 10. Alternatively, the line of NVP content may be depicted or scrolled in a horizontal fashion.

The system allows one user who is wearing the line-of-sight device over the chest—in the line of sight of another user wearing the same—to send messages wirelessly based on the NVP displayed. The message can only be sent if the NVP is set to the correct parameters set out in the NVP language section of this document. The NVP protocol has a unique number attached which allows the receiving line-of-sight device/smartwatch to decode it and activate an event such as but not limited to an image display, a sound played, a vibration, or a signal sent back to the sender or a signal being sent to the parent smartphone, which in turn activates an event.

This NVP signal is defined as a wireless signal sent from one line-of-sight device/smartwatch to another over a certain physical distance in line of sight. Using the NVP signal, any number of line-of-sight device/smartwatch can send any number of NVP signals to any number of receiving line-of-sight devices/smartwatches. The NVP signal can only be accepted if the correct NVP symbols are being displayed. By accepting an NVP signal, this can trigger the line-of-sight device/smartwatch to programmably display a set of shaped and, or colored symbols, communicating whether a first user can approach at least a second user or not for further digital interaction. Standardized or customized sound or tactile cues may also be activated to denote a permission to approach. Further digital interaction or a triggered digital event may be an exchange of NVP (user curated) line of content. Other examples of digital interaction or a triggered digital event may be a set of offers, adverts, images, videos or sounds. Further yet, another type of digital interaction or triggered digital event may comprise at least one of an offer and acceptance of at least a credit, between at least two devices, redeemable towards at least one of a good or service with any one of a participating vendor. Alternatively, the offer and acceptance may be a representation of at least one of a good or service, between at least two devices, redeemable towards at least one of a physical good or service associated with the representation from any one of a participating vendor. Furthermore, the digital interaction or digital event may further comprise facilitating a payment transaction between at least one of a device-to-device, device-to-vendor POS terminal, or device-to-vendor product code. In a preferred embodiment, the interaction or event is a relayed signal or data structure via at least one of the IR sender/receiver of device, device-QR code associated with the product subject to transaction, or device-POS terminal receiver.

Line-of-Sight Device: Smartphone: Smartwatch App Pairing

For each device that is placed within the line-of-sight device, the correct syncing app must run. This is to ensure that the NVP protocol and communication language is running and active. The smartwatch app controls the display of the colored symbols and NVP language on the smartwatch. The line-of-sight device software works in conjunction with the smartphone app to control the sending and receiving of infrared signals with a special encoded signal that identifies the user. This encoded signal is sent via Bluetooth back to the smartphone, which in turn uses the encoded signal to retrieve profile data from the server.

Line-of-Sight Device: Smartphone: Smartwatch Technical Routines

```
Line-of-Sight Hardware
    Arduino BLE
    IR Button
    Init
        BLE Send Rqst to Watch App "Give me ID"
        Wait( )
        BLE Receive Watch ID - store
    Loop( )
        Button Pressed
        Send IR containing Watch ID
        Send BLE to App "I've sent a vibe"        {Optional}
```

-continued

```
    Check for IR Received
        Decode IR to get Watch ID
        Send BLE to App "I've been Vibed by". ID
```

Smartphone APP
  Need an Android & iPhone App for each watch type

```
    Register
        Select Watch Type - BLE Connect to watch "Give me ID"
        Enter Details of User, picture etc.
        Send to server and create Profile
    Login
        Login details - verify - get watch type
        BLE Connect to watch
Home:
    Display Static page
    BLE Polling
BLE Received from Locket
    "Give me ID"
        BLE Send to Watch "Give me ID"
        BLE Receive from Watch ID
        BLE Send ID to Locket
    "I've sent a vibe"
        Add to stats - date and time of Vibe
        BLE to Watch "Vibe Sent"
"I've been Vibed by". ID
        Connect to Server - Get profile of user with ID
        Display Profile Page
        Button Options 'OK' - 'NO' - 'Ignore'
            'Ignore'
Time out after n minutes and return to home
            'OK'
                BLE to Watch "Thanks for Hi"
Enter Messaging mode- send Message
            'NO'
                BLE to Watch "No thanks"
```

Watch APP

```
            Display 'Vibe' home screen
            BLE Receive from APP
                "Give me ID"
                    Get Unique ID
                    BLE Send Watch ID
                "Thanks for Hi"
                    Display a 'Hi to you too'
                "No thanks"
                    Display "XX No thanks"
                "Vibe Sent"
                    Display 'Hi'
```

Figure 23:
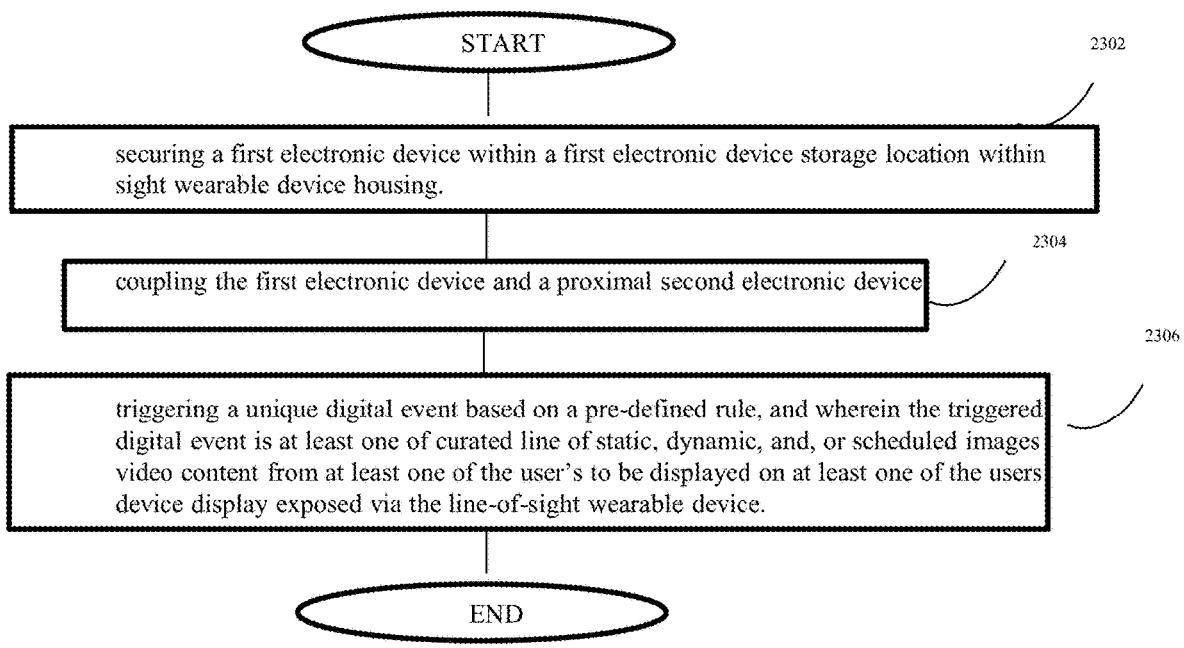
FIG. 23 illustrates a method for housing a first device for line-of-sight display in accordance with an aspect of the invention.

FIG. 23 illustrates a method for triggering a content display via a line-of-sight wearable device comprising the steps of: securing a first electronic device within a first electronic device storage location within a line-of-sight wearable device housing (2302); coupling the first electronic device and a proximal second electronic device (2304); and triggering a unique digital event based on a pre-defined rule, and wherein the triggered unique digital event is at least one of curated line of static, dynamic, and, or scheduled images and, or video content from at least one of the user's to be displayed on at least one of the users first device display exposed via the line-of-sight wearable device (2306).

Embodiments are described at least in part herein with reference to flowchart illustrations and/or block diagrams of methods, systems, and computer program products and data structures according to embodiments of the disclosure. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

I claim:

1. A line-of-sight wearable device worn over a chest of a first user, said device comprising:
    a housing defining at least a first electronic device storage location;
    a front wall on said housing having at least a portion to expose a display of a first electronic device;
    a first user mobile device wirelessly paired with the first electronic device, wherein at least one of a symbol or color-coded display on the first electronic device is caused programmably based on a pre-defined interaction rule and the display is exposed in a line-of-sight to at least a second user via the front wall portion of the housing worn over the chest of the first user signaling a willingness to be approached for triggering a digital interaction; and
    a processor;
    a non-transitory storage element coupled to the processor;
    encoded instructions stored in the non-transitory storage element, wherein the encoded instructions when implemented by the processor, configure the first electronic device to:
    interact with at least a wearable device worn by a second user (w.d.2) by: (1) being within a wireless communication short-range of the w.d.2; (2) transmitting a signal with a tag to the w.d.2; (3) accepting the signal with the tag by the w.d.2; (4) decoding said tag by the w.d.2 when the w.d.2 interaction rules displayed match interaction rules displayed on the first electronic device; and; (5) decoding said tag to trigger a digital event comprising at least one of a sound, vibration, flash, signal, symbol, color, text, curated line of static, dynamic or scheduled images or video content for display or download on the w.d.2, or for upload over a network.

2. The device of claim 1, wherein the housing is in any one of a substantially square, circular, rectangular, or triangular shape, wherein corner edges are round or sharp and planar surfaces are any one of flat, concave, convex, or hollow.

3. The device of claim 2, wherein the housing is in
    a form of a locket, configured to open by way of a back wall or the front wall to expose the first electronic device storage location.

4. The device of claim 3, wherein the back wall or front wall comprises at least a portion that opens by way of a latch in order to expose the first electronic device storage location.

5. The device of claim 3, wherein the back wall or front wall comprises at least a portion that opens by way of a hinged latch that allows the latch to swing close to secure or swing open to expose the first electronic device storage location.

6. The device of claim 1, wherein the front wall of the housing comprises at least a portion that is a transparent screen in order to expose the display of the first electronic device.

7. The device of claim 1, wherein the front wall of the housing comprises at least a portion that is hollowed out or through-walled in order to expose the display of the first electronic device.

8. The device of claim 1, wherein the first electronic device is any one of a wearable device with a display and capable of being paired to the first user mobile device via any one of short-range communication protocol.

9. The device of claim 8, wherein the first electronic device is a smart watch and the first user mobile device is a smart phone.

10. The device of claim 1, wherein the storage location is configured to accept and secure in place the first electronic device.

11. The device of claim 1, wherein the storage location is disposed with a magnetic fastener for securing in place the first electronic device.

12. The device of claim 1, wherein the first electronic device is in a form of a locket, wherein the locket is coupled to a strap to be worn over a neck of the first user.

13. The device of claim 1, wherein the first electronic device is embedded or woven into a fabric of a garment of the first user.

14. The device of claim 1, wherein the display on the first electronic device is caused programmably based on a predefined interaction rule and said display is at least one of a color-coded light display, sound-coded play, real-time social media display, image display, rotating image display, video playback, or audio playback.

15. The device of claim 1, wherein the display on the first electronic device is caused programmably based on a predefined interaction rule and said display is at least one of a color, symbol, or sound to signal a willingness to interact with a second user.

16. The device of claim 15, wherein the display signals at least one of a mood, willingness for approach and/or extent of engagement using a single and/or sequence of at least one displayed symbol, shape, color, flashing, sound, vibration, text, video, and/or image.

17. The device of claim 1, wherein the wearable device of the second user (w.d.2) is any one of a wearable badge device, smart watch, locket-housed smart watch, mobile device, clipped-on mobile device, clipped-on signaling device, eyewear.

18. A line-of-sight wearable device worn over a chest of a first user, said device comprising:
a housing defining at least a first electronic device storage location;
a front wall on said housing having at least a portion to expose a display of a first electronic device; and
a processor;
a non-transitory storage element coupled to the processor;
encoded instructions stored in the non-transitory storage element, wherein the encoded instructions when implemented by the processor, configure the first electronic device to:
interact with at least a wearable device worn by a second user (w.d.2) by: (1) being within a wireless communication short-range of the w.d.2; (2) transmitting a signal with a tag to the w.d.2; (3) accepting the signal with the tag by the w.d.2; (4) decoding said tag by the w.d.2 when the w.d.2 interaction rules displayed match interaction rules displayed on the first electronic device; and; (5) decoding said tag to trigger a digital event comprising at least one of a sound, vibration, flash, signal, symbol, color, text, curated line of static, dynamic or scheduled images or video content for display or download on the w.d.2, or for upload over a network.

* * * * *